United States Patent [19]

Kato

[11] Patent Number: 6,127,452
[45] Date of Patent: *Oct. 3, 2000

[54] OIL-BASED INK FOR PRINTING PLATE BY INK JET PROCESS AND METHOD FOR PREPARING PRINTING PLATE BY INK JET PROCESS

[75] Inventor: Eiichi Kato, Shizuoka, Japan

[73] Assignee: Fuji Photo Film Co., Ltd., Kanagawa, Japan

[ * ] Notice: This patent is subject to a terminal disclaimer.

[21] Appl. No.: 09/066,600

[22] Filed: Apr. 27, 1998

[30] Foreign Application Priority Data

Apr. 25, 1997 [JP] Japan ................... 9-123219

[51] Int. Cl.$^7$ ............... C09D 11/02; C09D 11/10; G03G 13/26; G03G 13/28
[52] U.S. Cl. .............. 523/160; 430/49
[58] Field of Search ................... 523/160, 161; 430/49; 347/54, 55, 103, 107, 100

[56] References Cited

U.S. PATENT DOCUMENTS

| | | |
|---|---|---|
| 5,039,598 | 8/1991 | Abramsohn et al. ............ 430/347 |
| 5,055,369 | 10/1991 | Kato et al. . |
| 5,112,718 | 5/1992 | Kato et al. . |

*Primary Examiner*—Vasu Jagannathan
*Assistant Examiner*—Callie E. Shosho
*Attorney, Agent, or Firm*—Sughrue, Mion, Zinn, Macpeak & Seas, PLLC

[57] ABSTRACT

An oil-based ink for a printing plate by an ink jet process comprising spraying an oil-based ink comprising at least resin particles dispersed in a nonaqueous solvent having an electric resistance of $10^9$ Ωcm or more and a dielectric constant of 3.5 or less on a water-resistant support having a lithographically printable hydrophilic surface dropwise from a nozzle to form an image, wherein said resin particles (PL) dispersed comprises: (i) at least one monofunctional monomer (A) which is soluble in a nonaqueous solvent and becomes insoluble therein by polymerization; (ii) at least one monofunctional macromonomer (MA) having a weight average molecular weight of $2\times10^4$ or less in which a polymerizable double bond group is combined with only one end of a main chain of a polymer comprising a repeating unit corresponding to a monomer; and (iii) a polymerization component, and wherein said resin particles (PL) dispersed are copolymer resin particles (PL) obtained by polymerization of a solution comprising: (a) at least one macromonomer (MM) having a weight average molecular weight of $1\times10^3$ to $2\times10^4$ in which a polymerizable double bond group is combined with only one end of a main chain of a polymer; (b) at least one monofunctional monomer (M) which becomes insoluble in the nonaqueous solvent by polymerization; and (c) at least one resin (P) for dispersion stabilization which is colloidally dispersed in the nonaqueous solvent.

2 Claims, 2 Drawing Sheets

OIL-BASED INK FOR PRINTING PLATE BY INK JET PROCESS AND METHOD FOR PREPARING PRINTING PLATE BY INK JET PROCESS

FIELD OF THE INVENTION

The present invention relates to an oil-based ink for preparing a printing plate by an ink jet process, and a method for preparing a printing plate by an ink jet process using it. More particularly, the present invention relates to an oil-based ink excellent in redispersibility, stability, image reproducibility and printability (press life), and a method for preparing a printing plate by an ink jet process using it.

BACKGROUND OF THE INVENTION

With recent developments in business machines and progress in office automation, in the field of light printing, offset lithographic systems have been widely applied in which printing process is conducted, namely ages are formed, on direct imaging lithographic printing plate precursors comprising water-resistant supports having provided thereon image receiving layers having hydrophilic surfaces.

Conventional printing plate precursors for direct imaging lithographic printing comprise supports formed of paper or plastic films which are subjected to water-resistant treatments having provided thereon image accepting layers (or image receiving layers) containing inorganic pigments, water-soluble resins and water resistance imparting agents. Methods are known in which lipophilic images are formed on such direct imaging lithographic printing plate precursor with typewriters or by hand writing using lipophilic ink, or by transferring images from ink ribbons by heat melting with heat transfer printers, thereby preparing printing plates.

However, the printing plates prepared by such methods are not sufficient in mechanical strength of image areas, so that missing easily takes place in the image areas in printing.

On the other hand, ink jet recording is a recording method low in noise and printable at high speed, and has recently been rapidly popularized.

As such ink jet recording systems, there are proposed various ink jet processes such as a so-called electric field controlling system in which ink is discharged using electrostatic attraction, a so-called drop-on-demand system (pressure pulse system) in which ink is discharged using the oscillation pressure of a piezoelectric element, and a so-called bubble (thermal) system in which ink is discharged using pressure developed by forming bubbles and allowing them to grow by heating at high temperature, and very detailed images can be obtained by these systems.

In these ink jet recording systems, aqueous ink using water as a main solvent, and oil-based ink using an organic solvent as a main solvent are generally used.

It is also carried out that the above-mentioned lithographic printing plate precursors are made with typewriters using ink jet recording systems, and in this case, aqueous ink in which water is used as a dispersing medium is also employed. However, the aqueous ink has the problem that blurs appear in images on precursor materials, or that the picture drawing speed is decreased because of slow drying. In order to reduce such a problem, a method using oil-based ink in which a nonaqueous solvent is used as a dispersing medium is disclosed in JP-A-54-117203 (the term "JP-A" as used herein means an "unexamined published Japanese patent application").

However, this method is also insufficient, because blurs are observed in actual printing process images, furthermore, blurs are developed in printing, and the number of printing sheets is limited to several hundred at the most. Furthermore, such ink has the problem of being liable to clog a nozzle for discharging minute ink droplets which make it possible to obtain printing process images having high resolution.

In the ink jet recording systems, ink is generally discharged from nozzles through filters, so that abnormal discharge of ink is liable to take place by clogging of the nozzles or the filters, changes in fluidity of ink with time, or other various factors.

This abnormal discharge of ink takes place with respect to not only aqueous ink compositions, but also oil-based ink compositions. Various proposals for improving such abnormal discharge of ink have been submitted. For example, in order to prevent the abnormal discharge of ink at the time when oil-based ink compositions are used, it is proposed that the viscosity and the specific resistance of the ink compositions are controlled as described in JP-A-49-50935, for the ink jet recording system of the electric field controlling system. It is further proposed that the dielectric constant and the specific resistance of solvents used in the ink compositions are controlled as described In JP-A-53-29808.

Furthermore, as attempts to prevent clogging of nozzles caused by general oil-based ink for ink jet printers, there are proposed, for example, methods in which the dispersion stability of pigment particles is improved (e.g., JP-A-4-25573, JP-A-5-25413 and JP-A-5-65443) and methods in which specific compounds are contained as ink compositions (e.g., JP-A-3-79677, JP-A-3-64377, JP-A-4-202386 and JP-A-7-109431).

However, when they are used in image formation of lithographic printing plates, all of them are poor in image strength in printing, and printing plates which can satisfy the press life have not been obtained.

SUMMARY OF THE INVENTION

An object of the present invention is to provide an oil-based ink for a printing plate by an ink jet process excellent in redispersibility, storage stability and press life.

Another object of the present invention is to provide an oil-based ink for a printing plate by an ink jet process which makes it possible to print many sheets of printed material having clear images.

A further object of the present invention is to provide an oil-based ink for a printing plate by an ink jot process which does not induce clogging in a nozzle and in the course of ink supply and stabilizes ink discharge.

A still further object of the present invention is to provide a method for preparing a printing plate by an ink jet process using the above-mentioned oil-based ink.

These and other objects of the present invention have been accomplished by the following:

(1) An oil-based ink for a printing plate by an ink jet process comprising spraying an oil-based ink comprising at least resin particles dispersed in a nonaqueous solvent having an electric resistance of $10^9$ Ωcm or more and a dielectric constant of 3.5 or less on a water-resistant support having a lithographically printable hydrophilic surface dropwise from a nozzle to form an image, wherein said resin particles (PL) dispersed comprises:

(i) at least one monofunctional monomer (A) which is soluble in a nonaqueous solvent and becomes insoluble therein by polymerization;

(ii) at least one monofunctional macromonomer (MA) having a weight average molecular weight of $2 \times 10^4$ or less in which a polymerizable double bond group represented by the following formula (II) is combined with only one end of a main chain of a polymer comprising a repeating unit corresponding to a monomer represented by the following formula (I); and (iii) a polymerization component represented by the following formula (III), and wherein said resin particles (PL) dispersed are copolymer resin particles (PL) obtained by polymerization of a solution comprising:

(a) at least one macromonomer (MM) having a weight average molecular weight of $1\times10^3$ to $2\times10^4$ in which a polymerizable double bond group which is the same as that represented by the above formula (II) is combined with only one end of a main chain of a polymer;

(b) at least one monofunctional monomer (M) which becomes insoluble in the nonaqueous solvent by polymerization; and (c) at least one resin (P) for dispersion stabilization which is colloidally dispersed in the nonaqueous solvent:

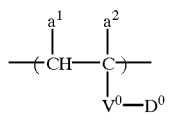
(I)

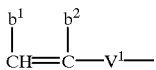
(II)

wherein, in formula (I), $X^0$ represents —COO—, —OCO—, —$(CH_2)_r$COO—, —$(CH_2)_r$OCO—, —O—, —$SO_2$—, —CONHCOO—, —CONHCONH—, —CON($D^{11}$)-, —$SO_2$N($D^{11}$)- or a phenylene group, in which $D^{11}$ represents a hydrogen atom or a hydrocarbon group having 1 to 22 carbon atoms, and r represents an integer of 1 to 4;

$a^1$ and $a^2$ are the same or different, and each represents a hydrogen atom, a halogen atom, a cyano group, a hydrocarbon group, —COO-$D^{12}$, or —COO-$D^{12}$ linked through a hydrocarbon group, in which $D^{12}$ represents a hydrogen atom or a hydrocarbon group which may be substituted;

$D^0$ represents a hydrocarbon group having 8 to 22 carbon atoms or a substituent having a total number of atoms of 8 or more, provided that hydrogen atoms attached to a carbon or nitrogen atom are excluded from the number, represented by the following formula (I'):

$$-(A^1\text{-}B^1)_m\text{-}(A^2\text{-}B^2)_n\text{-}D^{21} \qquad (I')$$

wherein, in formula (I'), $D^{21}$ represents a hydrogen atom or an aliphatic group having 1 to 22 carbon atoms;

$B^1$ and $B^2$ are the same or different, and each represents —O—, —CO—, —$CO_2$—, —OCO—, —$SO_2$—, —N($D^{22}$)-, —CON($D^{22}$)-, or —N($D^{22}$)CO—, in which $D^{22}$ has the same meaning as $D^{21}$;

$A^1$ and $A^2$ are the same or different, and each represents at least one group selected from a group represented by the following formula (I") and a hydrocarbon group having 1 to 18 carbon atoms, which each may be substituted, provided that, in the case of two or more, it represents a combination of any two or more of the groups represented by formula (I") and the hydrocarbon groups:

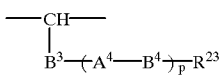
(I")

wherein, in formula (I"), $B^3$ and $B^4$ are the same or different, and each has the same meaning as $B^1$ and $B^2$;

$A^4$ represents a hydrocarbon group having 1 to 18 carbon atoms which may be substituted;

$D^{23}$ has the same meaning as $D^{21}$; and m, n and p are the same or different, and each represents an integer of 0 to 4, provided that m, n and p are not 0 at the same time;

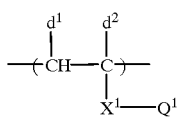
(III)

wherein, in formula (III), $X^1$ has the same meaning as $X^0$ in formula (I);

$d^1$ and $d^2$ are the same or different, and each has the same meaning as $a^1$ and $a^2$ in formula (I); and $Q^1$ represents an alkyl or alkenyl group having 10 to 22 carbon atoms;

(2) The oil-based ink for a printing plate by an ink jet process according to the above (1), wherein said resin (P) for dispersion stabilization is dispersed colloidally into the nonaqueous solvent to have an average particle diameter of 0.13 μm or less;

(3) A method for preparing a printing plate by an ink jet process comprising the step of:

spraying an oil-based ink comprising at least resin particles dispersed in a nonaqueous solvent having an electric resistance of $10^9$ Ωcm or more and a dielectric constant of 3.5 or less on a water-resistant support having a lithographically printable hydrophilic surface dropwise from a nozzle to form an image, wherein said resin particles dispersed are copolymer resin particles (PL) according to the above (1) or (2);

(4) The method according to the above (3), wherein said image formation by an ink jet process in conducted by a method of discharging the oil-based ink using an electrostatic field;

(5) The method according to any one of the above (3) or (4), wherein said lithographic printing plate precursor comprises a water-resistant support having provided thereon an image receiving layer having a lithographically printable hydrophilic surface, and the support has a specific electric resistance of $10^{10}$ Ωcm or less at least at an area directly under the image receiving layer;

(6) The method according to any one of the above (3) to (5), wherein said water-resistant support is a support having a specific electric resistance of $10^{10}$ Ωcm or less as a whole of the support; and (7) The method according to any one of the above (3) to (6), wherein said resin particles dispersed in the oil-based ink are electrically detectable particles positively or negatively charged.

Figure 1:
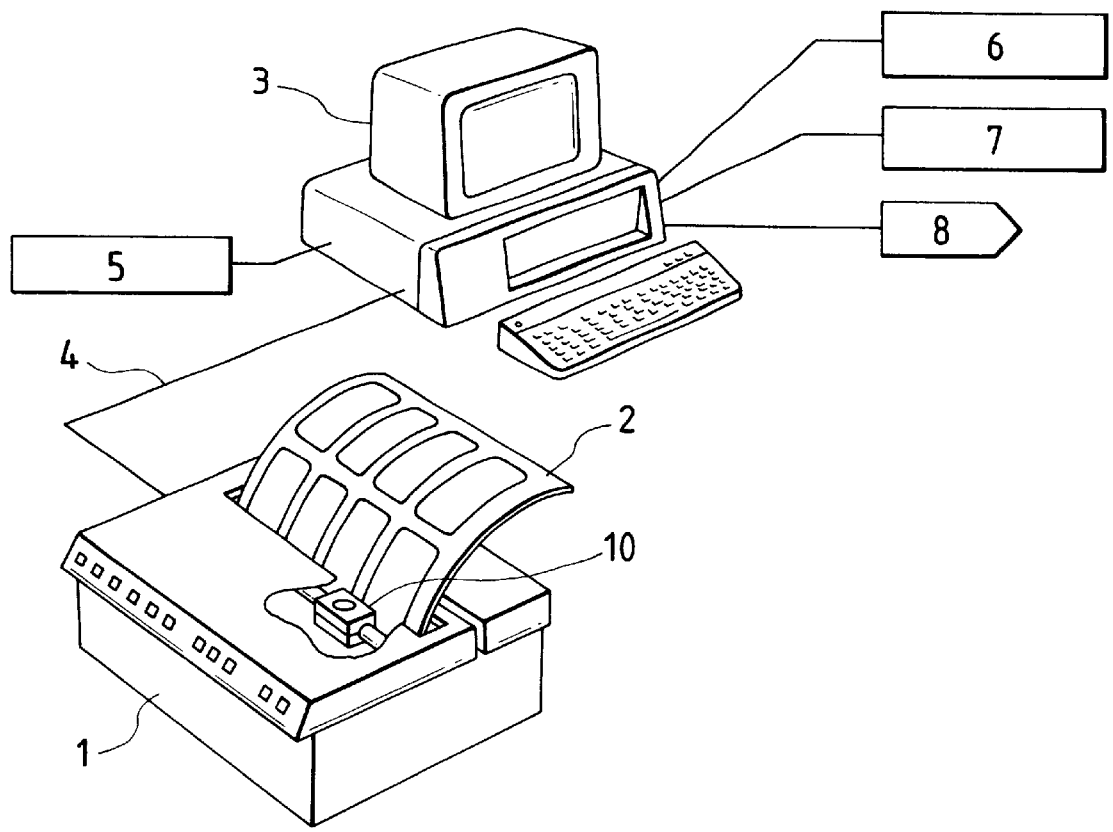
FIG. 1 is a schematic view showing one embodiment of a device system used in the present invention.

1 Ink jet recording device
2 Master
3 Computer
4 Path
5 Video camera
6 Hard disk
7 Floppy disk
8 Mouse
10 Head
10a Discharge slit
10b Discharge electrode
10c Counter electrode
11 Oil-based ink
101 Upper unit
102 Lower unit

DETAILED DESCRIPTION OF THE INVENTION

The present invention is characterized in that the above-mentioned oil-based ink is discharged on a printing precursor for lithographic printing by an ink jet process to form an image. The oil-based ink used is excellent in dispersion stability, redispersibility and storage stability, and it is possible to print clear images on a number of sheets by use of the resulting lithographic printing plate.

The oil-based ink for use in the present invention is described below.

The nonaqueous carrier liquids having an electric resistance of $10^9$ Ωcm or more and a dielectric constant of 3.5 or less used in the present invention preferably include straight chain or branched aliphatic hydrocarbons, alicyclic hydrocarbons, aromatic hydrocarbons and halogen-substituted products of these hydrocarbons. Specific examples thereof include octane, isooctane, decane, isodecane, decalin, nonane, dodecane, isododecane, cyclohexane, cyclooctane, cyclodecane, benzene, toluene, xylene, mesitylene Isoper-E, Isoper-G, Isoper-H, Isoper-L (Isoper: trade name of Exxon Co.), Shellsol 70, Shellsol 71 (Shellsol: trade name of Shell Oil Co.), Amsco OME and Amsco 460 (Amsco: trade name of Spirits Co.), and mixtures thereof. The upper limit value of the electric resistance of such nonaqueous carrier liquids is about $10^{16}$ Ωcm, and the lower limit value of the dielectric constant is about 1.80.

The nonaqueous dispersed resin particles (PL) (hereinafter also referred to as "latex particles"), which are the most important constituent in the present invention, are conducting polymerization and granulation in the presence of a resin (P) for dispersion stabilization which is dispersed colloidally in the nonaqueous solvent by polymerizing at least one monofunctional monomer (A) and at least one monofunctional macromonomer (MA).

Here, as the nonaqueous solvents, ones miscible with the nonaqueous carrier liquids of the above-mentioned oil-based ink are basically usable.

That is, as the solvents used in producing the dispersed resin particles, any solvents may be used as long as they are miscible with the above-mentioned carrier liquids. Preferred examples thereof include straight chain or branched aliphatic hydrocarbons, alicyclic hydrocarbons, aromatic hydrocarbons and halogen-substituted products of these hydrocarbons. For example, hexane, octane, isooctane, decane, isodecane, decalin, nonane, dodecane, isododecane, Isoper-E, Isoper-G, Isoper-H, Isoper-L, Shellsol 70, Shellsol 71, Amsco OME and Amsco 460 solvents can be used alone or as a mixture of them.

Solvents which can be used by mixing together with these organic solvents include alcohols (e.g., methyl alcohol, ethyl alcohol, propyl alcohol, butyl alcohol, fluorinated alcohols), ketones (e.g., acetone, methyl ethyl ketone, cyclohexanone), carboxylic acid esters (e.g., methyl acetate, ethyl acetate, propyl acetate, butyl acetate, methyl propionate, ethyl propionate), ethers (e.g., diethyl ether, dipropyl ether, tetrahydrofuran, dioxane), and hydrocarbon halides (e.g., methylene dichloride, chloroform, carbon tetrachloride, dichloroethane, methylchloroform).

These nonaqueous solvents used by mixing are desirably removed by distillation under heating or reduced pressure after polymerization granulation. However, even if they are taken in oil-based ink as latex particle dispersions, no problem is encountered as long as the requirements that the resistance of the ink is $10^9$ Ωcm or more and that the dielectric constant in 3.5 or less satisfied.

Usually, it is preferred that solvents similar to the carrier liquids are used in the stage of the production of resin dispersions. As described above, such solvents include straight chain or branched aliphatic hydrocarbons, alicyclic hydrocarbons, aromatic hydrocarbons and hydrocarbon halides.

The monofunctional monomers (A) for use in the present invention may be any, as long as they are monofunctional monomers soluble in nonaqueous solvents, but becomes insoluble therein by polymerization. Specific examples thereof include monomers represented by the following formula (IV):

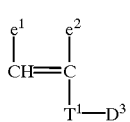

(IV)

wherein, in formula (IV), $T^1$ represents —COO—, —OCO—, —CH$_2$OCO—, —CH$_2$COO—, —O—, —CONHCOO—, —CONHOCO—, —SO$_2$—, —CON(W$^1$)-, —SO$_2$N(W$^1$)- or a phenylene group (a phenylene group is hereinafter described as "-Ph-", including 1,2-, 1,3- and 1,4-phenylene groups), in which W$^1$ represents a hydrogen atom or an aliphatic group having 1 to 8 carbon atoms which may be substituted (e.g., methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl, 3-methoxypropyl);

D$^3$ represents a hydrogen atom or an aliphatic group having 1 to 6 carbon atoms which may be substituted (e.g., methyl, ethyl, propyl, butyl, 2-chloroethyl, 2,2-dichloroethyl, 2,2,2-trifluoroethyl, 2-bromoethyl, 2-glycidylethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2-furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2-carboxyamidoethyl, 3-sulfoamidopropyl, 2-N-methylcarboxyamidoethyl, cyclopentyl, chlorocyclohexyl, dichlorohexyl); and $e^1$ and $e^2$ are the same or different and each has the same meaning as $a^1$ and $a^2$ in formula (I).

Specific examples of the monofunctional monomer (A) include vinyl esters or allyl esters of aliphatic carboxylic acids having 1 to 6 carbon atoms (e.g., acetic acid, propionic acid, butyric acid, monochloroacetic acid, trifluoropropionic acid); alkyl esters or amides having 1 to 4 carbon atoms which may be substituted of unsaturated carboxylic acids such as acrylic acid, methacrylic acid, crotonic acid, itaconic acid and maleic acid (the alkyl groups include, for example, methyl, ethyl, propyl, butyl, 2-chloroethyl, 2-bromoethyl, 2-fluoroethyl, trifluoroethyl, 2-hydroxyethyl, 2-hydroxypropyl, 2-cyanoethyl, 2-nitroethyl, 2-methoxyethyl, 2-methanesulfonylethyl, 2-benzenesulfonylethyl, 2-(N,N-dimethylamino)ethyl, 2-(N, N-diethylamino)ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl and 2-carboxyamidoethyl); styrene derivatives (e.g., a styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, N,N-dimethylaminomethylstyrene, vinylbenzenecarboxyamide, vinylbenzenesulfoamide); unsaturated carboxylic acids such as acrylic acid, methacrylic acid, crotonic acid, maleic acid and itaconic acid; cyclic acid anhydrides of maleic acid and itaconic acid; acrylonitrile; methacrylonitrile; and heterocyclic compounds having polymerizable double bond groups (specifically, for example, compounds described in "Polymer Data Handbook, -Fundamental Volume-", edited by Kobunshi Gakkai, pages 175 to 184, Baifukan (1986), e.g., N-vinylpyridine, N-vinylimidazole, N-vinyl-pyrrolidone, vinylthiophole, vinyltetrahydrofuran, vinyloxazoline, vinylthiazole, N-vinylmorpholine).

Two or more kinds of monomers (A) may be used in combination.

Then, the monofunctional macromonomer (MA) for use in the present invention is further described.

The monofunctional macromonomer (MA) is a macromonomer having a weight average molecular weight of $2\times10^4$ or less, preferably $1\times10^3$ to $2\times10^4$, in which a polymerizable double bond group represented by formula (II) is combined with only one end of a main chain of a polymer comprising a repeating unit corresponding to a monomer represented by formula (I).

In formulas (I) and (II), hydrocarbon groups contained in $a^1$, $a^2$, $X^0$, $D^0$, $b^1$ and $b^2$ each has carbon atoms shown (as an unsubstituted hydrocarbon group), but they may be substituted with a halogen atom, an acyl group, an amino group, a cyano group, an alkyl group having 1 to 5 carbon atoms, an alkoxy group, an aryl group which may be substituted with an alkyl or haloalkyl group, or an amido group.

In formula (I), $D^{11}$ in the substituent represented by $X^0$ represents a hydrocarbon (atom, as well as a hydrogen atom. Preferred examples of the hydrocarbon groups include alkyl groups having 1 to 22 carbon atoms which may be substituted (e.g., methyl, ethyl, propyl, butyl, heptyl, hexyl, octyl, nonyl, decyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl, 3-bromopropyl), alkenyl groups having 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, linoleyl), aralkyl groups having 7 to 12 carbon atoms which may be substituted (e.g., benzyl, phenetyl, 3-phenylpropyl, naphthylmethyl, 2-naphthylethyl, chlorobenzyl, bromobenzyl, methylbenzyl, ethylbenzyl, methoxybenzyl, dimethylbenzyl, dimethoxybenzyl), alicyclic groups having 5 to 8 carbon atoms which may be substituted (e.g., cyclohexyl, 2-cyclohexylethyl, 2-cyclopentylethyl), and aromatic groups having 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, dodecyloylamidophenyl).

When $X^0$ represents -Ph- (a phenylene group), a benzene ring may have a substituent. The substituents include halogen atoms (for example, chlorine and bromine) and alkyl groups (for example, methyl, ethyl, propyl, butyl, chloromethyl and methoxymethyl).

$a^1$ and $a^2$ are the same or different, and each preferably represents a hydrogen atom, a halogen atom (for example, chlorine or bromine), a cyano group, an alkyl group having 1 to 3 carbon atoms (for example, methyl, ethyl or propyl), —COO-$D^{13}$ or —CH$_2$COO-$D^{13}$ (wherein $D^{13}$ represents a hydrogen atom or an alkyl, alkenyl, aralkyl, alicyclic or aryl group having 1 to 18 carbon atoms, which may be substituted, and specific examples thereof are the same as those described for $D^{11}$ above).

When $D^0$ represents a hydrocarbon group having 8 to 22 carbon atoms, specific examples thereof are the same as those described for $D^{11}$ mentioned above.

The case where $D^0$ represents a substituent having a total number of atoms of 8 or more (excluding a hydrogen atom directly attached to a carbon or nitrogen atom) represented by formula (I') is described in detail.

$A^1$ and $A^2$ each represents at least one group selected from a group represented by formula (I") and a hydrocarbon group having 1 to 18 carbon atoms (examples of the hydrocarbon group include an alkyl group, an alkenyl group, an aralkyl group and an alicyclic group, and specific examples thereof include those described as $D^{11}$) (in the case of two or more, each represents a bond of the group of formula (I") and/or the hydrocarbon group).

More specifically, examples of $A^1$ and $A^2$ include any combinations of atomic groups such as —C($D^{31}$)($D^{32}$)- (in which $D^{31}$ and $D^{32}$ each represents a hydrogen atom, an alkyl group or a halogen atom), —(CH=CH)—, a phenylene group (-Ph-), a cyclohexylene group (it is represented by —C$_6$H$_{10}$—, including 1,2-cyclohexylene, 1,3-cyclohexylene, 1,4-cyclohexylene groups) and the group represented by formula (I").

In the binding group of formula (I),

it is preferred that a "binding main chain" composed of $X^0$ to $D^{21}$ (namely, $X^0$, $A^1$, $B^1$, $A^2$, $B^2$ and $D^{21}$) in a binding group has a total number of atoms constituting the binding main chain of 8 or more. When $A^1$ and $A^2$ represent hydrocarbon groups via formula (I"), -B$^3$-(A$^4$-B$^4$)$_p$-D$^{23}$ is included as the above binding main chain. Here, the number of atoms constituting the "binding main chain" means that, for example, when $U^1$ represents —COO— or —CONH—, the oxo group (=O group) and the hydrogen atom are not contained in the number of atoms, and the carbon atom, the other type oxygen atom and the nitrogen atom constituting the binding main chain are contained in the number of atoms. Accordingly, with respect to —COO— and —CONH—, the number of atoms is counted as 2. At the same time, when $R^{21}$ represents —$C_9H_{19}$, the hydrogen atoms are not contained in the number of atoms, and the carbon atoms are contained therein. In this case, therefore, the number of atoms is counted as 9.

In the repeating unit represented by formula (I) as described above, specific examples in the case where $D^0$ represents the substituent shown by formula (I') include repeating units shown below.

In the following formulas (1) to (19), each symbol shows the following contents: $r_1$: —H, —$CH_3$, —Cl or —CN; $r_2$: —H or —$CH_3$; l: an integer of 2 to 10; p: an integer of 2 to 6; q: an integer of 2 to 4; m: an integer of 1 to 12; n: an integer of 4 to 18.

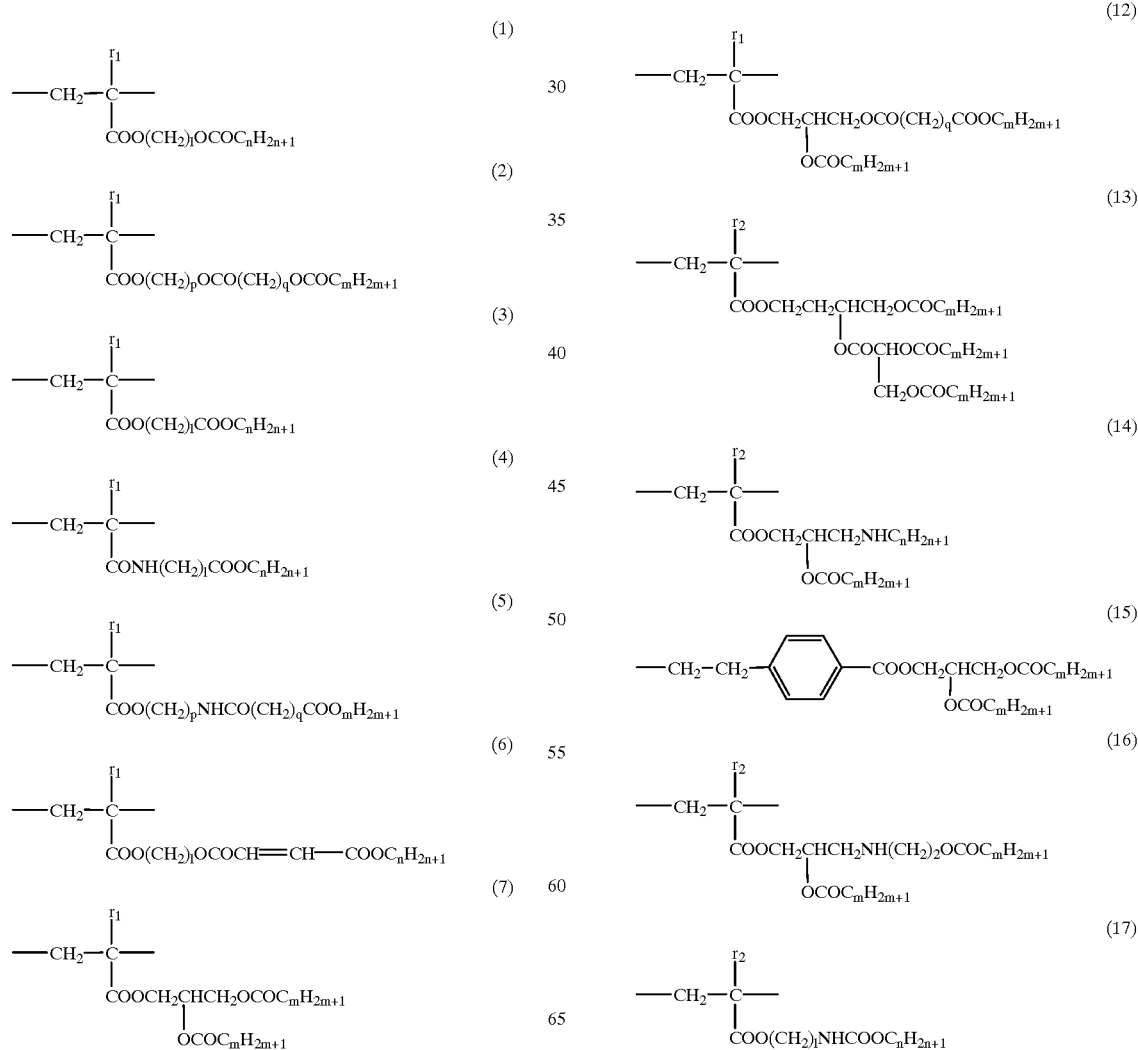

-continued

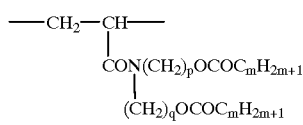
(18)

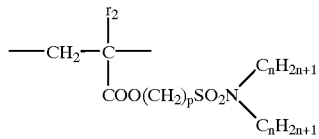
(19)

The macromonomer (MA) used in the present invention has a chemical structure in which a polymerizable double bond group represented by formula (II) is combined with only one end of a main chain of a polymer comprising repeating units corresponding to a monomer represented by formula (I) directly or through any binding group.

In formula (II), $V^1$ represents —COO—, —CONHCOO—, —CONHCONH—, —CONH— or a phenylene group.

Here, specific examples of the phenylene groups are the same as those of the phenylene groups for $X^0$ in formula (I).

$b^1$ and $b^2$ are the same or different and each has the same meaning as $a^1$ and $a^2$ in formula (I). Examples thereof are the same as those of $a^1$ and $a^2$.

It is more preferred that either of $b^1$ and $b^2$ in formula (II) is a hydrogen atom.

A group connecting a component of formula (I) to a component of formula (II) in constituted by any combination of atomic groups of a carbon-carbon bond (single bond or double bond), a carbon-heteroatom bond (examples of the heteroatoms include an oxygen atom, a sulfur atom, a nitrogen atom and silicon atom) and a heteroatom-heteroatom bond.

Of the macromonomers (MA) of the present invention, preferred are ones represented by the following formula (V):

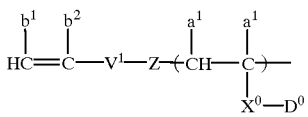
(V)

In formula (V), symbols other than Z have the same meanings as given for those in formulae (I) and (II).

Z represents a single bond, or an independent binding group selected from atomic groups such as —C($D^{41}$)($D^{42}$)- (in which $D^{41}$ and $D^{42}$ each independently represents a hydrogen atom, a halogen atom (e.g., fluorine, chlorine, bromine), a cyano group, a hydroxyl group, an alkyl group (e.g., methyl, ethyl, propyl)), —(C=CH)—, —$C_6H_{10}$— (a cyclohexylene group), -Ph- (a phenylene group), —O—, —S—, —CO—, —N($D^{43}$)—, —COO—, —SO—, —CON ($D^{43}$)-, —SON($D^{43}$)-, —NHCOO—, —NHCONH—, —Si ($D^{43}$)($D^{44}$)- (in which $D^{43}$ and $D^{44}$ each independently represents a hydrogen atom or a hydrocarbon group having the same meaning as given for D described above) and an independent binding group shown in groups shown below,

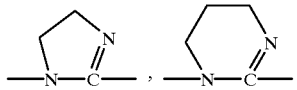

or a binding group constituted by any combination thereof.

Specific examples represented by the following formula (II') in formula (V) are shown below, but it is to be understood that the present invention is not limited thereto:

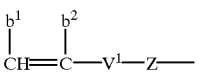
(II')

In the following, b represents —H or —$CH_3$; $m^1$ represents an integer of 1 to 12; and $n^1$ represents an integer of 2 to 12.

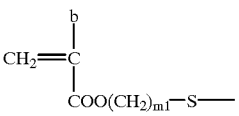
(II'-1)

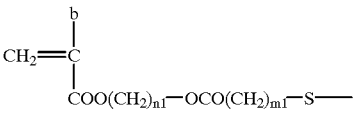
(II'-2)

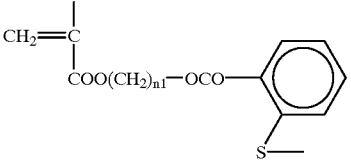
(II'-3)

(II'-4)

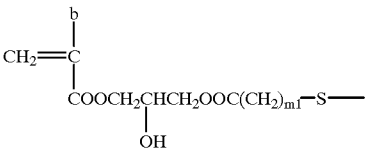
(II'-5)

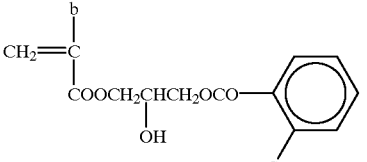
(II'-6)

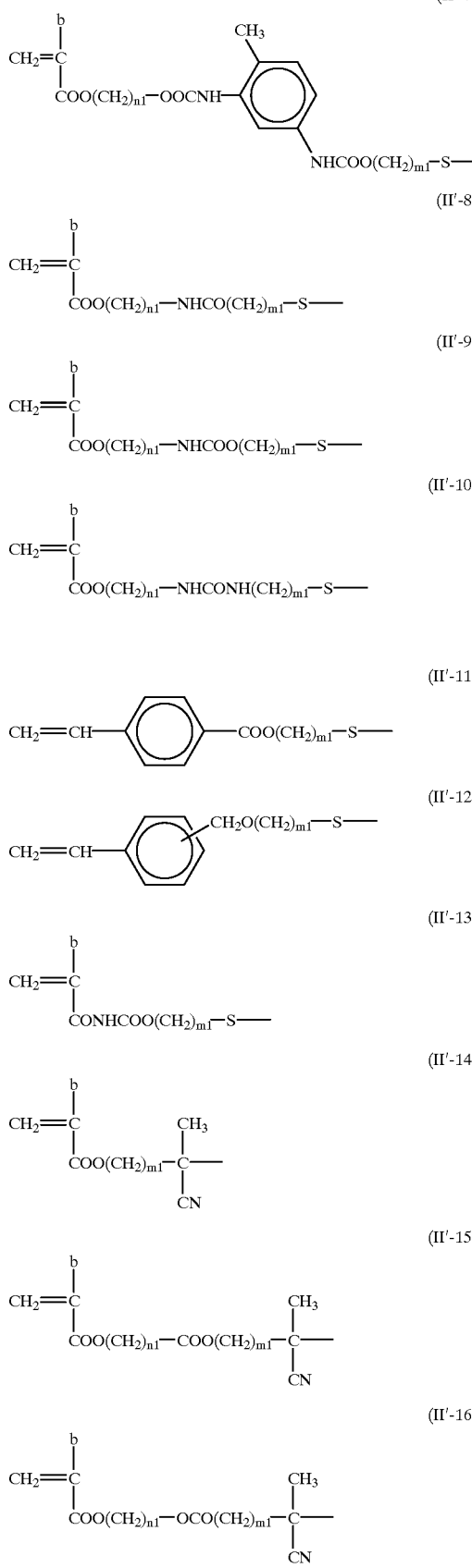
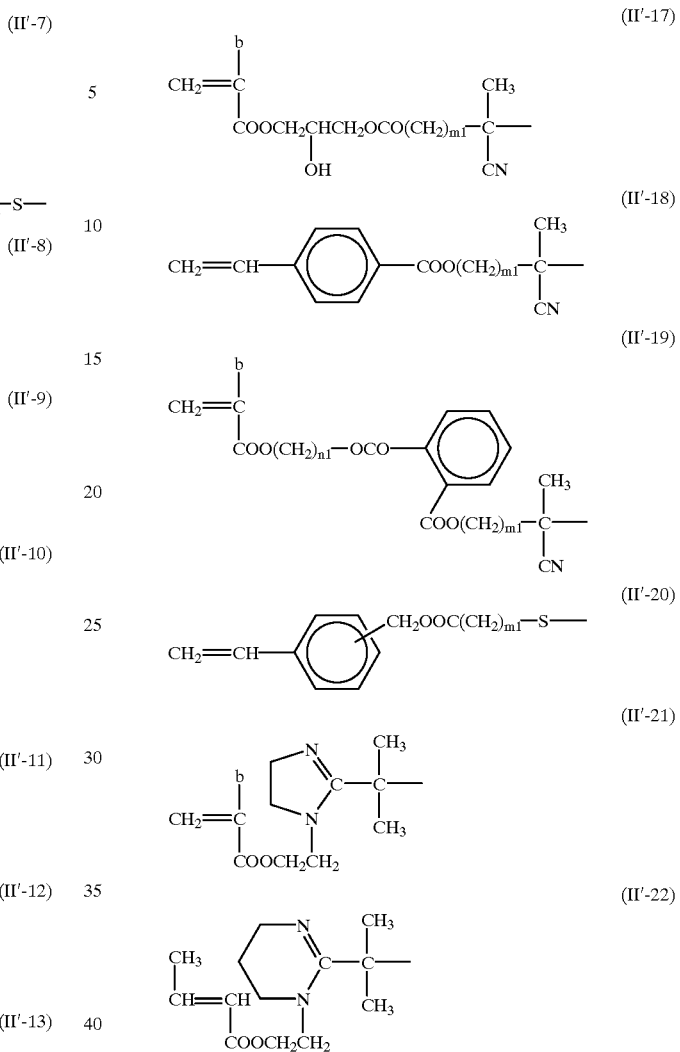

Furthermore, in polymerization components of the macromonomers (MA) used in the present invention, other repeating units may be contained as copolymerization components together with the repeating units corresponding to the monomers represented by formula (I).

The other copolymerization components may be any compounds, as long as they are monomers copolymerizable with the monomers corresponding to the repeating units of formula (I). Examples thereof include unsaturated carboxylic acids such as acrylic acid, methacrylic acid, itaconic acid, crotonic acid, maleic acid, vinylacetic acid and 4-pentenoic acid, esters and amides of these unsaturated carboxylic acids, vinyl esters and allyl esters of fatty acids having 1 to 22 carbon atoms, vinyl ethers, styrene and styrene derivatives and heterocyclic compounds containing unsaturated binding groups.

Specific examples thereof include but are not limited to the compounds shown as examples in the above-mentioned monomers (A).

In the total amount of the repeating units of the macromonomer (MA), a component of the repeating units corresponding to the monomer represented by formula (I) is contained preferably in an amount of 60% by weight or more of the total, and more preferably in an amount of 80% to 100% by weight.

The macromonomer (MA) of the present invention has a weight average molecular weight of $1\times10^3$ to $2\times10^4$, preferably $3\times10^3$ to $1.5\times10^4$.

Within each specified range described above, the dispersed resin particles show the effects in dispersion stability, redispersion stability and storage stability.

The macromonomers (MA) of the present invention can be produced by known synthesis methods. Examples thereof include (1) a method by ionic polymerization in which various reagents are allowed to react on terminals of living polymers to form macromonomers; (2) a method by radical polymerization in which various reagents are allowed to react with terminal reactive group-binding oligomers obtained by radical polymerization using polymerization initiators and/or chain transfer agents containing reactive groups such as carboxyl, hydroxyl and amino groups in their molecules, thereby forming macromonomers; and (3) a method by polyaddition condensation in which polymerizable double bond groups are introduced into oligomers obtained by polyaddition or polycondensation reaction, in the same manner as in the above-mentioned radical polymerization method.

Specifically, they can be synthesized according to methods described in reviews, and literatures and patents cited therein, such as P. Dreyfuss & R. P. Quirk, *Encycl. Polym. Sci. Eng.*, 7:551 (1987), P. F. Rempp & E. Franta, *Adv. Poly. Sci.*, 58:1 (1984), V. Percec, *Appl. Polym. Sci.*, 285:95 (1984), R. Asami & M. Takari, *Makromol. Chem. Suppl.*, 12:163 (1985), P. Rempp et al., *Makromol. Chem. Suppl.*, 8:3 (1984), Yusuke Kawakami, *Kagaku Kogyo*, 38:56 (1987), Yuya Yamashita, *Kobunshi*, 31:988 (1982), Shiro Kobayashi, *Kobunshi*, 30:625 (1981), Toshinobu Higashimura, *Nippon Setchaku Kyokaishi*, 18:536 (1982), Koichi Ito, *Kobunshi Kako*, 35:262 (1986) and Kishiro Azuma & Takashi Tsuda, *Kino Zairyo*, 10:5 (1987).

Examples of the above-mentioned polymerization initiators containing reactive groups in their molecules include azobis compounds, such as 4,4'-azobis(4-cyanovaleric acid), 4,4'-azobis(4-cyanovaleric acid chloride), 2,2'-azobis(2-cyanopropanol), 2,2'-azobis(2-cyanopentanol), 2,2'-azobis[2-methyl-N-(2-hydroxyethyl)propioamide], 2,2'-azobis{2-methyl-N-[1,1-bis(hydroxymethyl)ethyl]propioamide}, 2,2'-azobis{2-methyl-N-[1,1-bis(hydroxymethyl)-2-hydroxyethyl]propioamide}, 2,2'-azobis(2-amidinopropane), 2,2'-azobis[2-methyl-N-(2-hydroxyethyl)propioamide], 2,2'-azobis[2-(5-methyl-2-imidazoline-2-yl)propane], 2,2'-azobis[2-(4,5,6,7-tetrahydro-1H-1,3-diazepine-2-yl)propane], 2,2'-azobis[2-(3,4,5,6,-tetrahydropyrimidine-2-yl)propane], 2,2'-azobis[2-(5-hydroxy-3,4,5,6,-tetrahydropyrimidine-2-yl)propane], 2,2'-azobis{2-[1-(2-hydroxyethyl)-2-imidazoline-2-yl]propane}, 2,2'-azobis[N-(2-hydroxyethyl)-2-methylpropionamidine] and 2,2'-azobis[N-(4-aminophenyl)-2-methylpropionamidine].

Examples of the chain transfer agents containing specific reactive groups in their molecules include mercapto compounds containing the reactive groups or substituent groups derivable to the reactive groups (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3mercapto-2-butanol, mercaptophenol, 2-mercaptoethylamine, 2-mercaptoimidazole, 2-mercapto-3-pyridinol) and iodinated alkyl compounds containing the reactive groups or substituent groups derivable to the reactive groups (e.g., iodoacetic acid, iodopropionic acid, 2-iodoethanol, 2-iodoethanesulfonic acid, 3-iodopropanesulfonic acid). Preferred examples thereof include mercapto compounds.

The amounts of these chain transfer agents and the polymerization initiators used are each preferably 0.5 to 20 parts by weight, more preferably 1 to 10 parts by weight, based on 100 parts by weight of the total monomers.

The resin for dispersion of the present invention comprises at least one monomer (A) and at least one functional macromonomer (MA). Furthermore, if the resin synthesized by these monomers is insoluble for the nonaqeous solvent, the desirable dispersion resin according to the present invention can be obtained.

More specifically, the monofunctional macromonomer (MA) is used at 0.1 to 20% by weight, 0.3 to 15% by weight, per the monomer (A) to be insolublized.

The weight average molecular weight of the dispersed resin of the present invention is preferably $1\times10^3$ to $1\times10^6$, more preferably $8\times10^3$ to $5\times10^5$. As to thermal properties, the dispersed resin of the present invention has preferably a glass transition point ranging from 15° C. to 80° C. or a softening point of 38° C. to 120° C., more preferably a glass transition point ranging from 20° C. to 60° C. or a softening point of 40° C. to 90° C.

Within the ranges as described above, the dispersed resin particles of the oil-based ink of the present invention are excellent in dispersion stability, redispersion stability and storage stability, the rapid fixing property after image formation is good, images are retained also in printing, and the high press life is exhibited.

The resin (P) for dispersion stabilization used for changing the solvent-insoluble polymer prepared by the polymerization of the monomer into a soluble resin dispersion will be explained below.

The resin (P) for dispersion stabilization is a comb copolymer comprising a main chain portion which is the nonaqueous solvent-insoluble polymer component and a comb portion which is the solvent-soluble polymer component mainly containing a polymer component represented by formula (III).

The ratio of the macromonomer (MM) as the copolymerization component of the comb copolymer is 10% to 80% by weight, and preferably 20% to 60% by weight, based on the total components of the resin (P) for dispersion stabilization.

Within this range, the average particle size of resin particles (PL) obtained by polymerization granulation is homogenized, and the redispersibility of the resulting resin particles is significantly improved.

The weight average molecular weight (hereinafter referred to as "Mw" for brevity) of the resin (P) for dispersion stabilization which is the comb copolymer of the present invention is $2\times10^4$ to $5\times10^5$, and preferably $3\times10^4$ to $1\times10^5$.

The Mw of the macromonomer (MM) is $5\times10^3$ to $2\times10^4$, and preferably $7\times10^3$ to $1.5\times10^4$.

More preferably, the resin (P) is dispersed colloidally in the nonaqueous solvent, and the average particle size (diameter) of the colloid particles is 0.13 μm or less, and preferably 0.10 μm or less.

The macromonomer (MM) contained in the resin (P) for dispersion stabilization of the present invention is further described below.

In formula (III), $X^1$ has the same meaning as $X^0$ shown in formula (I).

$Q^1$ represents an alkyl or alkenyl group having 10 to 32 carbon atoms.

$d^1$ and $d^2$ are the same or different, and have the same meanings as $a^1$ and $a^2$ shown in formula (I).

A polymerizable double bond group combining with one terminal and of a polymer main chain of the macromonomer (MM) has the same meaning as the group indicated in formula (II) shown in the above-mentioned macromonomer (MA).

$Q^1$ preferably represents an alkyl or alkenyl group having 10 to 22 carbon atoms, which may be straight or branched. Examples thereof include decyl, dodecyl, tridecyl, tetradecyl, hexadecyl, octadecyl, docosanyl, eicosanyl, decenyl, dodecenyl, tridecenyl, tetradecenyl, hexadecenyl, octadecenyl, linoleyl and docosenyl groups.

Furthermore, the above-mentioned polymerizable double bond group may directly combine with one terminal and of the polymer main chain comprising the polymer component indicated by formula (I), or may combine with it through a connecting group.

Specifically, examples thereof include the same groups as described for the macromonomer (MA).

The macromonomers (MM) of the present invention can be produced by known synthesis methods, and specifically, they can be synthesized in the same manner as described for the above-mentioned macromonomers (MA).

The amount of a chain transfer agent or polymerization initiator used is from 0.1 part to 10 parts by weight, and preferably from 0.5 part to 5 parts by weight, based on 100 parts by weight of the total monomers.

The monofunctional monomer (M) constituting the other copolymer component of the comb copolymer (P) of the present invention is described below.

The monomer (M) may be any monomer, as long as it is a compound which is copolymerizable with the above-mentioned macromonomer (MM) and becomes insoluble in said nonaqueous solvent by polymerization.

Preferred examples thereof include the monomers represented by general formula (IV) shown for the above-mentioned monofunctional monomers (A), and other monomers copolymerizable therewith.

The monomers (M) may be used alone or as a combination of two or more of them.

These monomers other than the monomers represented by formula (IV) are contained in an amount within the range not exceeding 20 by weight per 100 parts by weight of polymer component of the resin (P) for dispersion stabilization.

The dispersed resin particles (PL) used in the present invention are generally produced by heat polymerization of the resins (P) for dispersion stabilization, the monomer (A) and the macromonomers (MA) an described above in the nonaqueous solvents in the presence of polymerization initiators such as benzoyl peroxide, bisazoisobutyronitrile and butyllithium. Specifically, there are (1) a method of adding the polymerization initiator to a mixed solution of the resin (P) for dispersion stabilization, the monomer (A) and the macromonomer (MA), (2) a method of adding dropwise the monomer (A) and the macromonomer (MA) together with the polymerization initiator to a solution in which the resin (P) for dispersion stabilization is dissolved, (3) a method of arbitrarily adding the polymerization initiator and the remainders of the monomer (A) and the macromonomer (MA) to a mixed solution containing the total amount of the resin (P) for dispersion stabilization and parts of the monomer (A) and the macromonomer (MA), and (4) a method of arbitrarily adding a mixed solution of the resin (P) for dispersion stabilization, the monomer (A) and the macromonomer (MA) to the nonaqueous solvent together with the polymerization initiator. The dispersed resin particles can be produced using any of these methods.

The total amount of the monomer (A) and the macromonomer (MA) is about 10 to 100 parts by weight, preferably 10 to 80 parts by weight, based on 100 parts of the nonaqueous solvent.

The amount of the resin (P) for dispersion stabilization is 3 to 30 parts by weight, preferably 5 to 20 parts by weight, based on 100 parts of the amount of the above total monomers.

The polymerization reaction is about 40 to 180° C., preferably 50 to 120° C. The reaction time is preferably 3 to 15 hours.

When the above-mentioned polar solvents, such as alcohols, ketones, ethers and esters, are used in combination with the nonaqueous solvents used in the reaction, or when unreacted monomers of the monomers (A) and the macromonomers (MA) to be subjected to polymerization granulation remain, it is preferred that the polar solvents or the unreacted monomers are removed by distillation under heating to temperatures equal to or higher than boiling points of the solvents or the monomers, or under reduced pressure.

The nonaqueous dispersed resin particles (PL) produced according to the present invention as described above are present as particles which are fine and uniform in particle size distribution. The mean particle size thereof is 0.15 µm to 0.8 µm, preferably 0.16 µm to 0.4 µm.

This particle size can be determined with CAPA-500 (trade name, manufactured by Horiba, Ltd.).

The resins (P) for dispersion stabilization used in the present invention are soluble in organic solvents, and specifically, they are preferably dissolved in an amount of at least 5 parts by weight based on 100 parts by weight of toluene solvent at a temperature of 25° C.

The weight average molecular weight of the dispersed resin of the present invention is preferably $5 \times 10^3$ to $1 \times 10^6$, and more preferably $8 \times 10^3$ to $5 \times 10^5$.

As to thermal properties, the dispersed resin of the present invention has preferably a glass transition point ranging from 15° C. to 80° C. or a softening point of 35° C. to 120° C., preferably a glass transition point ranging from 20° C. to 60° C. or a softening point of 38° C. to 90° C.

Within the ranges as described above, the dispersed resin particles of the oil-based ink of the present invention are excellent in dispersion stability, redispersion stability and storage stability, the rapid fixing property after image formation is good, images are retained also in printing, and the high press life is exhibited.

At the same time, they show very stable dispersibility, and particularly, even when repeatedly used in a recording device for a long period of time, they are good in dispersibility and easily redispersed, so that contamination due to adhesion of the resin particles to each part of the device is not observed at all.

Furthermore, the rapid treatment by heating after ink image formation easily forms a strong coating on a surface of a support for a lithographic printing plate, thereby exhibiting the good fixing property. This makes it possible to print a large number of sheets (high press life) also in offset printing.

The oil-based ink of the present invention bringing about the effects as described above becomes available according to the insoluble latexes of the present invention.

That is to say, when the resin (P) for dispersion stabilization of the comb block copolymer in which the main chain portion of the polymer is insoluble in the solvent and the comb portion is soluble in the solvent is present in a solvent for polymerization granulation in a finely dispersed colloidal state and the monofunctional monomer (A) forming resin particles is insolubilized with the progress of the polymerization reaction to form the particles, the monomer (A) interacts with the solvent-insoluble portion of the resin (P) for dispersion stabilization to form the dispersed particles. As a consequence, said resin (P) is efficiently adsorbed by the insoluble resin particles (PL).

The resin (P) adsorbed by the resin particles has the comb structure, and the comb portion thereof is soluble in the nonaqueous solvent. Accordingly, the affinity thereof for the nonaqueous solvent is significantly good, and the comb portion of the adsorbed resin (P) is present in the vicinity of the dispersed resin particle interface. It is conceivable that this improves the affinity in the vicinity of the resin interface and the polymer chain of the resin (P) causes a so-called steric repulsion effect known as dispersion stabilization of nonaqueous latexes.

Furthermore, the macromonomer (MA) mainly comprising repeating units containing specific substituents high in affinity for the dispersing solvent is used in combination with the monomer (A) for polymerization granulation, so that the monomer (A) insolubilized in polymerization granulation is copolymerized with the macromonomer (MA) in the resulting insoluble resin particles (PL) of the present invention. Accordingly, the specific substituent portions contained therein are designed so as to improve the affinity for the nonaqueous solvent, because the particles are formed by nonaqueous dispersion polymerization, and disposed on the interface (surface) portion of the particle structure, because of better solvent affinity than those get into the inside of the particle structure. As a result, it is presumed that the affinity for the dispersing medium on the particle surface, as well as the resin (P) for dispersion stabilization, is improved to more enhance the effect of preventing the coagulation between the particles.

It is preferred that the oil-based ink used in the present invention contains coloring materials as coloring components for detecting printing plates after processing, together with the above-mentioned dispersed resin particles.

As the coloring materials, any can be used as long as they are pigments and dyes previously used in oil-based ink compositions or liquid developers for electrostatic photography.

As the pigments, ones generally used in the technical field of printing can be used, regardless of inorganic pigments or organic pigments. Specifically, known pigments can be used without particular limitation, such as carbon black, cadmium red, molybdenum red, Chrome Yellow, cadmium yellow, Titan Yellow, chromium oxide, pyridian, Titan Cobalt Green, ultramarine blue, Prussian blue, cobalt blue, azo pigments, phthalocyanine pigments, quinacridone pigments, isoindolinone pigments, dioxazine pigments, threne pigments, perylene pigments, perynone pigments, thioindigo pigments, quinophthalone pigments and metal complex pigments.

Preferred examples of the dyes include oil-soluble dyes such as azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallophthalocyanine dyes.

These pigments and dyes may be used alone or can be used appropriately in combination. They are preferably contained within the range of 0.01% to 5% by weight based on the whole ink.

These coloring materials may be dispersed by themselves in the nonaqueous solvents as dispersed particles, separately from the dispersed resin particles, or allowed to be contained in the dispersed resin particles. When they are allowed to be contained in the dispersed resin particles, the pigments are generally coated with resin materials of the dispersed resin particles to form resin-coated particles, and for the dyes, surface portions of the dispersed resin particles are generally colored therewith to form colored particles. As one of the methods, there is a method described in JP-A-57-48738 in which a dispersed resin is dyed with a preferable dye. As another method, there is a method described in JP-A-53-54029 in which a dispersed resin is allowed to chemically combine with a dye, or a method described in JP-B-44-22955 (the term "JP-B" as used herein means an "examined Japanese patent publication") in which a monomer previously containing a dye is used in the production by polymerization granulation to form a dye-containing copolymer.

The dispersed resin particles and the colored particles (or coloring material particles) contained in the oil-based ink of the present invention are electrically detectable particles positively or negatively charged.

It is attainable to impart the electric detecting property to these particles by appropriately utilizing the technology of developers for wet electrostatic photography. Specifically, it is carried out by using electric detecting materials described in "Recent Developments and Utilization of Electrophotographic Development Systems and Toner Materials", pages 139 to 148, "Fundamental and Application of Electrophotographic Techniques", edited by Denshi Shashin Gakkai, pages 497 to 505 (Corona, 1988), and Yuji Harazaki, "Electro-photography", 16 (No. 2), 44 (1977), and other additives.

Specifically, it is described, for example, in British Patents 893,429 and 934,038, U.S. Pat. Nos. 1,122,397, 3,900,412 and 4,606,989, JP-B-4-51023, JP-B-6-19595, JP-B-6-19596, JP-B-6-23865, JP-A-60-185963 and JP-A-2-13965.

Charge regulating agents are preferably added in an amount of 0.001 part to 1.0 part by weight based on 1000 parts by weight of dispersing medium or carrier liquid. Various additives may be further added if desired, and the upper limit of the total amount of these additives is restricted by the electric resistance of the oil-based ink. That is, if the electric resistance of the ink with the dispersed particles removed is lower than $10^9$ $\Omega$cm, it becomes difficult to obtain continuous tone images of good quality. It is therefore necessary to control the amount of each additive added within this limit.

The water-resistant supports having lithographically printable hydrophilic surfaces used in the present invention may be any as long as they provide hydrophilic surfaces suitable for lithography, and supports used for conventional offset printing can be used as such.

Preferably, the surfaces of the image receiving layers receiving ink images are hydrophilic surfaces having a contact angle with water of 5 degrees or less, more preferably 0 degree, which give printed material generating no ink stains in non-image areas as offset printing plates.

Preferred embodiments thereof include water-resistant supports comprising water-resistant substrates having provided thereon image receiving layers having lithographically printable hydrophilic surfaces (hereinafter also referred to as a precursor for lithographic printing).

Examples of the water-resistant supports include a plastic sheet, paper for which printability is provided, an aluminum sheet, a zinc sheet, a bimetal sheet (e.g., a copper-aluminum sheet, a copper-stainless steel sheet and a chromium-copper sheet), a trimetal sheet (e.g, a chromium-copper-aluminum sheet, a chromium-lead-iron sheet, a chromium-copper-stainless steel sheet), preferably having a thickness of 0.1 to 3 mm, most preferably 0.1 to 1 mm.

Furthermore, they include paper having a thickness of 80 µm to 200 µm subjected to water-resistant treatment, paper laminated with plastic films or metal foil, or a plastic film. Preferably, the water-resistant support has electroconductivity, and a specific electric resistance of $10^{10}$ Ωcm or less at least at an area directly under the image receiving layer. The specific electric resistance is preferably $10^8$ Ωcm or less.

In order to provide the specific electric resistance of at least an area directly under the image receiving layer on a substrate such as paper and a film, for example, a layer comprising an electroconductive filler such as carbon black and a binding agent is coated, a metal foil is stuck, and a metal is evaporated.

On the other hand, examples of the support having an electroconductivity as a whole include electroconductive paper to which sodium chloride is impregnated, a plastic film with which an electroconductive filler is mixed, and a metal plate such as aluminum.

On the above electroconductivity range, when ink droplets which have been charged in ink jet recording by electric field control are adhered to the image-receiving layer, the charge of the ink droplets is disappeared quickly through earth, and a clear image having no disorder is formed.

The specific electric resistance (volume specific electric resistance, electric resistivity) was measured by a three-terminal method using a guard electrode according to JIS K-6911.

The image reproducibility and the press life can be further improved by restricting the smoothness of the surface on the side adjacent to the image receiving layer of the support to 300 (second/10 ml) or more by the Beck smoothness. Such an improving effect is obtained even if the smoothness of the surface of the image receiving layer is the same, and it is considered that an increase in the smoothness of the surface of the support has improved the adhesive quality between the image area and the image receiving layer.

In the present invention, the smoothness of the surface of the image receiving layer is preferably 50 (second/10 ml) or more, and more preferably 80 (second/10 ml) or more, by the Beck smoothness.

Defects and blurs of ink images formed by the magnitude of unevenness of the image receiving layers are preferably inhibited at a Beck smoothness of 50 or more.

Here, the Beck smoothness can be measured with a Beck smoothness tester. The Beck smoothness tester is a tester for measuring a time required for a definite amount (10 ml) of air to pass through between a test piece and a glass surface under reduced pressure, wherein the test piece is pressed to a highly smoothly finished circular glass plate having a hole at its center at a definite pressure (1 kg/cm$^2$).

The support having an electroconductivity as a whole is explained below.

For example, the support is obtained by providing both sides of an electroconductive precursor paper obtained by impregnating sodium chloride into a substrate with a water-resistant electroconductive layer.

In the present invention, the precursor paper used for the substrate include wood pulp paper, synthetic pulp paper and mixed paper of wood pulp paper and synthetic pulp paper as they are. The thickness of the precursor paper is preferably 80 µm to 200 µm.

The composition for providing a layer having an electroconductivity is explained below.

Forming of an electroconductive layer on a water-resistant substrate is carried out in the same manner as in the above-described formation of the support having an electroconductivity as a whole. That is, one surface of the substrate is coated with a layer containing an electroconductive filler and a binding agent having a thickness of 5 µm to 20 µm, or laminated with a metal foil or a plastic film having an electroconductivity. The electroconductive filler includes particulated carbon black, graphite, metal powder (e.g., silver powder, copper powder, nickel powder), stannic oxide powder, flake aluminum or nickel, fiber carbon, brass, aluminum, copper and stainless steel.

The resin used for the binding agent can be selected from various resins appropriately, and specifically, includes hydrophobic resins (e.g., acrylic resin, vinyl chloride resin, styrene resin, styrene-butadiene resin, styrene-acrylate resin, urethane resin, vinylidene chloride resin, vinyl acetate resin) and hydrophilic resins (e.g., polyvinyl alcohol resin, cellulose derivative resin, starch and derivatives thereof, polyacrylamide resin, styrene-maleic anhydride copolymer).

The electroconductive layer may be formed by laminating an electroconductive thin film. Examples of the electroconductive thin film include a metal foil and an electroconductive plastic film. More specifically, the metal foil laminated material includes an aluminum foil and the electroconductive plastic film laminated material includes a polyethylene resin with which carbon black is mixed. The aluminum foil may be hard or soft, and the thickness thereof is preferably 5 µm to 20 µm.

The polyethylene resin laminated film with which carbon black is mixed is preferably obtained by an extrusion laminating method. The method comprises melting polyolefin by heating to form a film, immediately pressing the film on precursor paper, and cooling it for laminating. Various apparatus for the method are known. The thickness of the laminated layer is preferably 10 µm to 30 µm. As the support having an electroconductivity as a whole, a plastic film having an electroconductivity as a substrate and a metal sheet can be used as they are so long as the water-resistivity is satisfied.

The plastic film having an electroconductivity includes polypropylene or polyester film with which an electroconductive filer such as carbon fiber or carbon black is mixed. The metal sheet includes aluminum. The thickness of the substrate is preferably 80 µm to 200 µm. If it is less than 80 µm, strength as a printing plate is insufficient. If it exceeds 200 µm, handling properties such as a transportability in a drawing apparatus are decreased.

The composition for providing a layer having an electroconductivity is explained below.

Forming of an electroconductive layer on a water-resistant substrate is carried out in the same manner as in the above-described formation of the support having an electroconductivity as a whole. That is, one surface of the substrate is coated with a layer containing an electroconductive filler and a binding agent having a thickness of 5 µm to 20 µm, or laminated with a metal foil or a plastic film having an electroconductivity.

Furthermore, in addition to the above methods, for example, a metal vaporization film such as aluminum, tin, palladium or gold may be coated on a plastic film.

According to the above methods, a support having a specific electric resistance of $10^{10}$ Ωcm or less as a whole of the support.

The image receiving layer having is provided on the water-resistant support, and the thickness thereof is preferably 5 µm to 50 µm.

For example, the image receiving layer comprises a water-soluble binder, an inorganic pigment and a water-resistance imparting agent as its main component. The binder includes water-soluble resins, such as PVA, modified PVA (e.g., carboxyl PVA), starch and derivatives thereof, CMC, hydroxyethyl cellulose, casein, gelatin, polyacrylate, polyvinylpyrrolidone, poly(vinyl methyl ether), a copolymer of vinyl acetate and crotonic acid, a copolymer of maleic anhydrate, and a copolymer of styrene and maleic acid.

The water resistance imparting agent includes glyoxal, a primary condensation product of a melamine formaldehyde resin, an urea formaldehyde resin or the like, a modified polyamide resin such as a methylated proamide resin, and a polyamide-polyamine-epichlorohydrin resin. Examples of the inorganic pigments include clay, kaolin, calcium carbonate, silica, titanium oxide, zinc oxide, barium sulfate, alumina and talc. Among these, silica is preferred.

In addition, the image receiving layer may contain a crosslinking catalyst such as ammonium chloride or a silane coupling agent.

A method for forming an image on the above-mentioned precursor for lithographic printing (hereinafter also referred to as a "master") is described below. As a device system for performing such a method, there is, for example, one shown in FIG. 1.

The device system shown in FIG. 1 comprises an ink jet recording device 1 using an oil-based ink.

As shown in FIG. 1, pattern information of images (graphics or sentences) to be formed on a master 2 is first supplied from an information supply source such as a computer 3 to the ink jet recording device 1 using oil-based ink through a transmittal means such as a path 4. A head for ink jet recording 10 of the recording device 1 stores oil-based ink therein, and sprays fine droplets of the ink on the master 2 according to the above-mentioned information, when the master 2 passes through in the recording device 1. Thereby, the ink adheres to the master 2 according to the above-mentioned pattern.

Thus, the image formation on the master 2 is completed to obtain a processing master (a printing precursor for processing).

Figure 2:
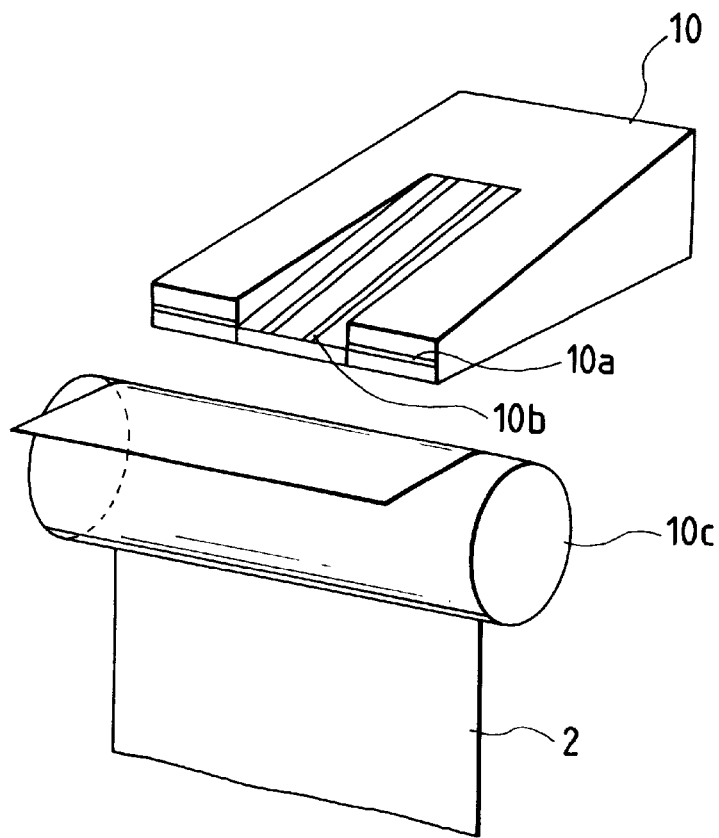
FIG. 2 is a schematic view showing a main part of an ink jet recording device used in the present invention.
Figure 3:
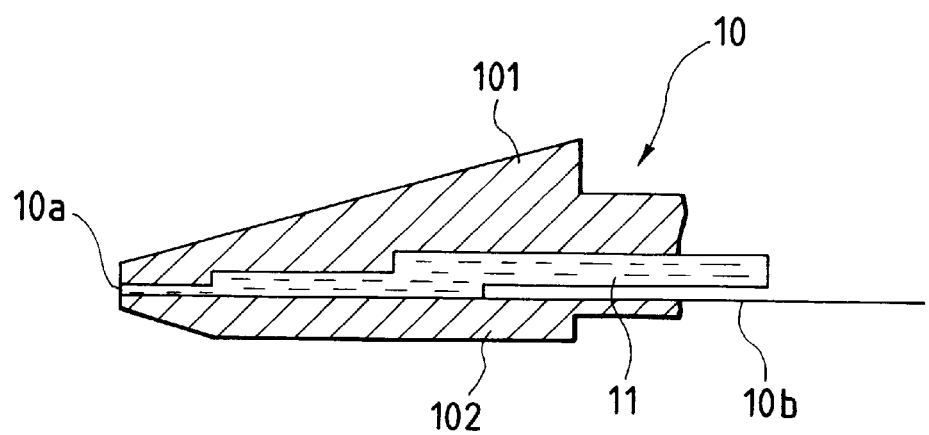
FIG. 3 is a partially sectional view showing a head of the ink jet recording device used in the present invention.

An embodiment of the ink jet recording device as shown in the device system of FIG. 1 is shown in FIG. 2 and FIG. 3. In FIG. 2 and FIG. 3, members common to the members in FIG. 1 are designated by the common reference characters. FIG. 2 is a schematic view showing a main part of such an ink jet recording device, and FIG. 3 is a sectional view showing a part of the head.

The head 10 attached to the ink jet recording device has a slit between an upper unit 101 and a lower unit 102, a leading edge thereof forms a discharge slit 10a, a discharge electrode 10b is disposed in the slit, and the inside of the slit is filled with oil-based ink 11, as shown in FIG. 2 and FIG. 3.

In the head 10, voltage is applied to the discharge electrode 10b according to a digital signal of pattern information of images. As shown in FIG. 2, a counter electrode 10c is provided opposite to the discharge electrode 10b, and the master 2 is placed on the counter electrode 10c. The application of voltage forms a circuit between the discharge electrode 10b and the counter electrode 10c, and the oil-based ink 11 is discharged from the discharge slit 10a of the head 10, thereby forming images on the master 2 placed on the counter electrode 10c.

It is preferred that the width of the discharge electrode 10b is as narrow as possible in its leading edge, for forming images of high quality, for example, conducting printing.

For example, the head of FIG. 3 is filled with oil-based ink, the discharge electrode 10b whose leading edge has a width of 20 μm is used, the distance between the discharge electrode 10b and the counter electrode 10c is adjusted to 1.5 mm, and a voltage of 3 kV is applied between these electrodes for 0.1 millisecond, whereby 40 μm-dot printed letters can be formed on the master 2.

Production examples of resins for dispersion stabilization, production examples of latex particles and examples of the present invention are shown below to illustrate the effects of the present invention in more detail, but it is to be understood that the present invention is not limited thereto.

PRODUCTION EXAMPLE 1

Macromonomer (M-1)

A mixed solution of 100 g of octadecyl methacrylate, 2 g of 3-mercaptopropionic acid and 200 g of toluene was heated to a temperature of 70° C. with stirring under a steam of nitrogen. Then, 0.5 g of 2,2'-azobis(isobutyronitrile) (herein referred to as A.I.B.N.) was added as a polymerization initiator thereto to conduct a reaction for 4 hours, 0.5 g of A.I.B.N. was further added to conduct the reaction for 3 hours, and 0.3 g of A.I.B.N. was still further added to conduct the reaction for 3 hours. Then, 8 g of glycidyl methacrylate, 1.0 g of N,N-dimethyldodecylamine and 0.5 g of t-butylhydroquinone were added to the reaction solution, and stirred at a temperature of 100° C. for 10 hours. After cooling, the reaction solution was reprecipitated in 2 liter of methanol to obtain 82 g of a white powder. The weight average molecular weight (Mw) of the polymer was $1\times10^4$ (the weight average molecular weight indicates a value converted to polystyrene by the G.P.C. method).

Macromonomer (M-1)

$$CH_2=\underset{COOCH_2CHCH_2OOC-(CH_2)_2-S-(CH_2-\underset{COOC_{18}H_{37}}{\overset{CH_3}{\underset{|}{C}}})}{\overset{CH_3}{\underset{|}{C}}}$$

PRODUCTION EXAMPLES 2 to 11

Macromonomers (M-2) to (M-11)

-Macromonomers (M-2) to (M-11) were synthesized in the same manner as in Production Example 1 of macromonomer (M-1) with the exception that only octadecyl methacrylate is replaced by compounds corresponding to the following Table 1. The weight average molecular weight of each macromonomer obtained ranged from $9\times10^3$ to $1\times10^4$.

TABLE 1

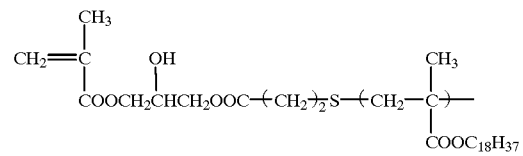

| Production Example | Macromonomer (M) | $a_1/a_2$ | X |
|---|---|---|---|
| 2 | M-2 | —H/—CH₃ | COOC₁₂H₂₅ |
| 3 | M-3 | —H/—CH₃ | COOC₁₃H₂₇ |
| 4 | M-4 | —H/—CH₃ | COOC₁₆H₃₃ |

TABLE 1-continued $$CH_2=\underset{\underset{COOCH_2CHCH_2OOC-(CH_2)_2-S-(CH-\underset{X}{\overset{a_2}{C}})-}{\underset{OH}{|}}}{\overset{CH_3}{\underset{|}{C}}}$$

| Production Example | Macro-monomer (M) | $a_1/a_2$ | X |
|---|---|---|---|
| 5 | M-5 | —H/—H | $\underset{COOC_{18}H_{37}}{\|}$ |
| 6 | M-6 | —H/—CH$_3$ | —(CH$_2$)$_2$OCO(CH$_2$)$_2$COOC$_9$H$_{19}$ |
| 7 | M-7 | —H/—CH$_3$ | —(CH$_2$)$_2$OCO(CH$_2$)$_2$COOC$_4$H$_9$ |
| 8 | M-9 | —H/—H | —(CH$_2$)$_2$OCOCH=CH-COOC$_5$H$_{11}$ |
| 9 | M-9 | —H/—H | —CH$_2$CHCH$_2$OCOC$_6$H$_{13}$<br>$\underset{OCOC_6H_{13}}{\|}$ |
| 10 | M-10 | —H/—CH$_3$ | —CH$_2$CHCH$_2$OCOC$_5$H$_{11}$<br>$\underset{OCOCH_3}{\|}$ |
| 11 | M-11 | —H/—H | —(CH$_2$)$_2$OCO(OH$_2$)$_2$SO$_2$C$_8$H$_{17}$ |

PRODUCTION EXAMPLE 12

Macromonomer (M-12)

A mixed solution of 100 g of tetradecyl methacrylate, 2 g of thioethanol and 200 g of toluene was heated to a temperature of 70° C. with stirring under a steam of nitrogen. Then, 1.0 g of A.I.B.N. was added as a polymerization initiator thereto to conduct a reaction for 4 hours, 0.5 g of A.I.B.N. was further added to conduct the reaction for 3 hours, and then, 0.3 g of A.I.B.N. was still further added to conduct the reaction for 3 hours. The reaction solution was cooled to room temperature, and 8 g of 2-carboxyethyl acrylate was added thereto. Then, a mixed solution of 12.7 g of D.C.C. and 60 g of methylene chloride was added dropwise thereto for 1 hour. Then, 1.0 g of t-butylhydroquinone was added, followed by stirring as such for 4 hours.

Crystals deposited were filtered off, and the resulting filtrate was reprecipitated in 2 liters of methanol. The precipitated oily product was collected by decantation, dissolved in 150 ml of methylene chloride, and reprecipitated again in 2 liter of methanol. The oily product was collected, and dried under reduced pressure to obtain a polymer having a Mw of $8 \times 10^3$ in a yield of 60 g.

Macromonomer (M-12)

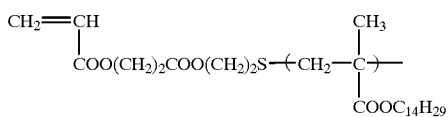

PRODUCTION EXAMPLES 13 to 15

Macromonomers (M-13) to (M-15)

Macromonomers shown in the following Table 2 were each produced in the same manner as in the macromonomer (M-12) described above with the exception that a methacrylate monomer (corresponding to tetradecyl methacrylate) and an unsaturated carboxylic acid (corresponding to 2-carboxyethyl methacrylate) were each replaced in Production Example 12. The weight average molecular weight of each macromonomer obtained in a yield of 60 to 70 g ranged from $7 \times 10^3$ to $9 \times 10^3$.

TABLE 2

| Production Example | Macro-monomer (M) | Chemical Structure of Macromonomer (M) |
|---|---|---|
| 13 | M-13 | $CH_2=\underset{\underset{COO(CH_2)_2S-(CH_2-\underset{\underset{COOC_{20}H_{41}}{\|}}{\overset{CH_3}{\underset{\|}{C}}})-}{\|}}{\overset{Cl}{\underset{\|}{C}}}$ |
| 14 | M-14 | $CH_2=\underset{\underset{COO(CH_2)_2S-((CH_2-\underset{\underset{COOC_{12}H_{25}}{\|}}{\overset{CH_3}{\underset{\|}{C}}})_{50}-(CH_2-\underset{\underset{COOC_{18}H_{37}}{\|}}{\overset{}{\underset{\|}{CH}}})_{50})-}{\|}}{\overset{CN}{\underset{\|}{C}}}$ |

(Weight ratio)

TABLE 2-continued

| Production Example | Macro-monomer (M) | Chemical Structure of Macromonomer (M) |
|---|---|---|
| 15 | M-15 | $CH_2=CH-C_6H_4-COO(CH_2)_2S-[CH_2-C(CH_3)(COO(CH_2)_2OCOC_{10}H_{21})]_n-$ |

PRODUCTION EXAMPLE 16

Macromonomer (M-16)

A mixed solution of 100 g of 2,3-dihexanoyloxy-propyl methacrylate, 150 g of tetrahydrofuran and 50 g of isopropyl alcohol was heated to a temperature of 75° C. under a steam of nitrogen. Then, 5.0 g of 4,4'-azobis(4-cyanovaleric acid) (referred to as "A.C.V." simply) was added as a polymerization initiator thereto to conduct a reaction for 5 hours, and 1.0 g of A.C.V. was further added to conduct the reaction for 4 hours. After cooling, the reaction solution was reprecipitated in 1.5 liter of methanol, and the oily product was collected by decantation and dried under reduced pressure. The yield was 85 g.

A mixture of 50 g of this oily product, 15 g of glycidyl methacrylate, 1.0 g of N,N-dimethyldodecylamine, 1.0 g of 2,2'-methylene bis(6-t-butyl-p-cresol) and 100 g of toluene was stirred at a temperature of 100° C. for 15 hours. After cooling, the reaction solution was reprecipitated in 1 liter of petroleum ether to obtain 63 g of a white powder. The weight average molecular weight was $7 \times 10^3$.

Macromonomer (MA-16)

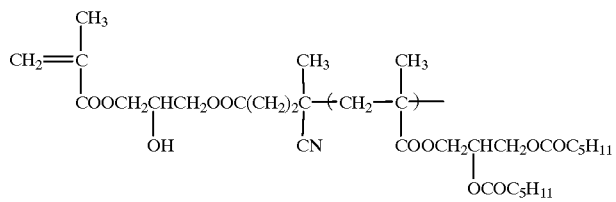

PRODUCTION EXAMPLE 101

Resin (P-1) for Dispersion Stabilization

A mixed solution of 30 g of styrene, 70 g of the macromonomer (M-1) and 200 g of toluene was heated to a temperature of 85° C. with stirring under a steam of nitrogen. Then, 3.0 g of A.I.B.N. was added thereto and allowed to react for 4 hours. Further, 1.0 g of A.I.B.N. was added thereto and allowed to react for 2 hours, and furthermore, 0.5 g of A.I.B.N. was added thereto and allowed to react for 2 hours. After cooling, the mixed solution was reprecipitated in 1.5 l of methanol, and the particles were collected and dried to obtain 88 g of white powder.

The weight average molecular weight (Mw) thereof was $4.5 \times 10^4$.

The particles obtained were dispersed in a solvent, Isoper H, and the particle size thereof was measured by using a laser diffraction/scatter system particle size distribution measuring apparatus, LA-910 (manufactured by Horiba, Ltd.). The particle diameter was 0.05 μm.

PRODUCTION EXAMPLES 102 TO 110

Resins (P-2) to (P-10) for Dispersion Stabilization

Respective resins for dispersion stabilization were produced in the same manner as in Production Example 101 with the exception that monomers and multifunctional monomers described in Table 3 shown below were each used in place of styrene and the macromonomer (M) in Production Example 101.

The Mw of the respective resins (P) was within the range of $4 \times 10^4$ to $6 \times 10^4$.

TABLE 3

| Ex.[1) ] | Resin | Monomer (M) | Macro-monomer (M) | Particle size in Isoper G (μm) |
|---|---|---|---|---|
| 102 | P-2 | Styrene: 50 g | M-5: 50 g | 0.07 |
| 103 | P-3 | Vinyl acetate: 55 g | M-2: 20 g M-4: 25 g | 0.06 |
| 104 | P-4 | Methyl methacrylate: 20 g | M-12: 60 g | 0.06 |
| 105 | P-5 | Methyl methacrylate: 20 g Methyl acrylate: 10 g | M-13: 70 g | 0.05 |
| 106 | P-6 | Methyl methacrylate: 25 g Methacrylic acid: 5 g | M-14: 75 g | 0.06 |

TABLE 3-continued

| Ex.[1] | Resin | Monomer (M) | Macro-monomer (M) | Particle size in Isoper G (μm) |
|---|---|---|---|---|
| 107 | P-7 | Vinyl acetate: 40 g<br>Methyl vinyl ether: 10 g | M-3: 50 g | 0.07 |
| 108 | P-8 | Styrene: 50 g<br>Vinyltoluene: 10 g | M-15: 40 g | 0.08 |
| 109 | P-9 | Methyl methacrylate: 20 g<br>Ethyl acrylate: 10 g | M-14: 70 g | 0.04 |
| 110 | P-10 | Styrene: 40 g | M-2: 60 g | 0.06 |
| 111 | P-11 | Vinyl acetate: 40 g<br>N-Methylpyrrolidone: 5 g | M-12: 20 g<br>M-1: 35 g | 0.03 |

[1]Production Example

PRODUCTION EXAMPLE 201

Latex Particles (PL-1)

A mixed solution of 10 g of the resin (P-1) for dispersion stabilization, 20 g of methyl methacrylate, 80 g of methyl acrylate, 1.0 g of the macromonomer (M-1), and 400 g of Isoper H was heated to a temperature of 65° C. with stirring under a steam of nitrogen. As a polymerization initiator, 1.0 g of 2,2'-azobis(isovaleronitrile) (referred to as "A.I.V.N.") was added thereto and allowed to react for 3 hours. Further, 0.8 g of A.I.V.N. was added thereto to conduct the reaction for 2 hours. Further, 0.8 g of an initiator, A.I.B.N., was added thereto, followed by heating to a temperature of 85° C. to conduct the reaction for 3 hours. After cooling, the product was passed through a 200-mesh nylon cloth. The resulting white dispersion was a latex having a rate of polymerization of 98% and an average particle size of 0.20 μm. The particle size was measured with CAPA-500 (manufactured by Horiba, Ltd.).

A part of the above-mentioned white dispersion was centrifuged by use of a centrifuge (the number of revolution: 1×10$^4$ r.p.m., the time of revolution: 1 hour), and resin particles precipitated were collected and dried. The weight average molecular weight (Mw) and the glass transition point (Tg) of the resin particles were measured. As a result, the Mw was 2×10$^5$, and the Tg was 26° C.

PRODUCTION EXAMPLES 202 TO 206

Latex Particles (PL-2) to (PL-6)

Latex particles were produced in the same manner as in Production Example 201 with the exception that compounds described in Table 4 shown below wore each used in place of the resin (P-1) for dispersion stabilization, the monomers (A) (namely, methyl methacrylate and methyl acrylate) and the macromonomer (M-1) used in Production Example 201 of latex particles.

The rate of polymerization of the respective resulting latex particles was 95% to 100%, the average particle size was within the range of 0.18 μm to 0.25 μm, and the monodispersibility was also good.

The Mw of the respective resin particles was within the range of 9×10$^4$ to 2×10$^5$.

TABLE 4

| Ex[1] | Latex (PL) | Resin (P) | Monomer (A) | Macro-monomer (M) | Resin Tg |
|---|---|---|---|---|---|
| 202 | PL-2 | P-11:<br>10 g | Vinyl acetate: 95 g<br>Vinyl propionate: 10 g<br>Crotonic acid: 5 g | M-2: 1.5 g | 42° C. |
| 203 | PL-3 | P-9:<br>12 g | Methyl methacrylate: 50 g<br>Methyl acrylate: 50 g | M-12:<br>2.0 g | 30° C. |
| 204 | PL-4 | P-6:<br>11 g | Methyl methacrylate: 65 g<br>Methyl acrylate 35 g | M-14:<br>1.5 g | 31° C. |
| 205 | PL-5 | P-8:<br>10 g | Vinyl acetate: 90 g<br>Styrene: 10 g | M-15:<br>1.0 g | 43° C. |
| 206 | PL-6 | P-3:<br>10 g | Vinyl acetate: 100 g | M-5:<br>0.8 g | |

[1]Production Example

PRODUCTION EXAMPLE 207

Latex Particles (PL-7)

A mixed solution of 11 g of the resin (P-4) for dispersion stabilization and 177 g of Isoper H was heated to a temperature of 60° C. with stirring under a steam of nitrogen.

Further, a mixed solution of 30 g of methyl methacrylate, 70 g of methyl acrylate, 1.5 of the macromonomer (M-6), 200 g of Isoper G and 1.0 g of A.I.V.N. was added thereto for 2 hours, followed by stirring for 2 hours. Furthermore, 0.5 of A.I.B.N. was added thereto, and the temperature was elevated to 80° C. and the resulting solution was stirred for 3. After cooling, the product was passed through a 200-mesh nylon cloth. The resulting white dispersion was a latex having a rate of polymerization of 99% and an average particle size of 0.22 μm.

The Mw of the resin particles was 3×10$^5$, and the Tg thereof was 27° C.

PRODUCTION EXAMPLES 208 TO 216

Latex Particles (PL-8) to (PL-16)

Latex particles were produced in the same manner as in Production Example 207 with the exception that described in Table 5 shown below were each used in place of the resin (P-4) for dispersion stabilization, the monomer (that is, methyl methacrylate and methyl acrylate), and the macromonomer (M-6).

The rate of polymerization of the respective resulting latex particles was 95% to 98%, the average particle size was within the range of 0.18 μm to 0.25 μm, and the monodispersibility was also good.

TABLE 5

| Ex[1] | Latex (PL) | Resin (P) | Monomer (A) | Macro-monomer (M) | Resin Tg |
|---|---|---|---|---|---|
| 208 | PL-8 | P-1:<br>10 g | Methyl methacrylate: 50 g<br>Ethyl acrylate: 50 g | M-11:<br>1.5 g | 27° C. |
| 209 | PL-9 | P-4:<br>12 g | Methyl mehtacrylate: 25 g<br>Methyl acrylate: 75 g | M-9: 2.0 g | 26° C. |
| 210 | PL-10 | P-1:<br>12 g | Isopropyl methacrylate: 25 g<br>Methyl acrylate: 75 g | M-8: 2.5 g | 30° C. |
| 211 | PL-11 | P-8:<br>10 g | Benzyl methacrylate: 40 g<br>Methyl acrylate: 60 g | M-7: 2.0 g | 28° C. |

TABLE 5-continued

| Ex[1)] | Latex (PL) | Resin (P) | Monomer (A) | Macro-monomer (M) | Resin Tg |
|---|---|---|---|---|---|
| 212 | PL-12 | P-6: 10 g | Ethyl methacrylate: 45 g Ethyl acrylate: 55 g | M-10: 3.0 g | 25° C. |
| 213 | PL-13 | P-5: 12 g | Ethyl methacrylate: 60 g Methyl acrylate: 40 g | M-4: 1.8 g | 28° C. |
| 214 | PL-14 | P-4: 10 g | Methyl methacrylate: 20 g 2-Cynoethyl acrylate: 8 g Methyl acrylate: 72 g | M-14: 2.0 g | 30° C. |
| 215 | PL-15 | P-7: 12 g | Vinyl acetate: 80 g Styrene: 10 g Vinyl propionate: 10 g | M-15: 1.5 g | 34° C. |
| 216 | PL-16 | P-6: 13 g | Methyl methacrylate: 20 g Acrylic acid: 5 g Methyl acrylate: 75 g | M-13: 2.0 g | 32° C. |

[1)]Production Example

EXAMPLE 1

Preparation of Lithographic Printing Plate Precursor

The following composition 1 having the following contents was placed in a paint shaker (manufactured by Toyo Seiki Co., Ltd.) together with glass beads, and dispersed for 60 minutes. Then, the glass beads were filtered off to obtain a dispersion.

Composition:

| | |
|---|---|
| 10% Gelatin solution | 100 g |
| Silica: Silysia 310 (manufactured by Fuji Silysia Chemical Co., Ltd.) | 8 g |
| 20% Solution of Colloidal Silica: (Snowtex CR503) (manufactured by Nissan Chemical Industries, Ltd.) | 37.5 g |
| Alkyl Ester Fluoride FC 430 (manufactured by 3M Co.) | 0.8 g |
| Hardening Compound [$CH_2=CHSO_2CH_2CONH(CH_2)_3NHCOCH_2SO_2CH=CH_2$] | 0.24 g |
| Water | 54 g |

Using a support of Metalme 100TS comprising a PET film having a thickness of 100 μm having provided thereon a vaporized aluminum layer, the above-mentioned composition was applied onto the support by use of a wire bar and dried at 100° C. for 10 minutes to form an image receiving layer having an amount coated of 8 g/m², thereby obtaining a precursor for lithographic printing.

The Beck smoothness of the surface was 250 (second/10 ml), and the contact angle with water thereof was 5 degree or less.

The smoothness of the image receiving layer was determined by measuring the smoothness (second/10 ml) of the printing plate precursor using a Beck smoothness tester (manufactured by Kumagaya Riko Co., Ltd.) under the condition of an air volume of 10 ml.

The contact angle of the image receiving layer with water was determined by placing 2 μl of distilled water on the printing plate precursor and measuring the surface contact angle (degrees) after 30 seconds with a surface contact angle motor (CA-D, manufactured by Kyowa Kaimen Kagaku Co., Ltd.).

Preparation of Oil-Based Ink (IK-1)

Ten grams of dodecyl methacrylate/acrylic acid copolymer (copolymerization ratio: 95/5 by weight ratio), 10 g of Alkali Blue and 30 g of Isoper G were placed in a paint shaker (manufactured by Tokyo Seiki Co., Ltd.) together with glass beads, and dispersed for 4 hours to obtain a fine dispersion of Alkali Blue.

Forty-five grams (as a solid amount) of latex particles (PL-1) of Production Example 201, 18 g of the above-mentioned Alkali Blue dispersion, and 0.08 g of an octadecene-half maleic acid octadecylamide copolymer were diluted with 1 liter of Isoper G, thereby obtaining blue oil-based ink.

A servo plotter, DA8400, manufactured by Graphtech Co., which can write an output from a personal computer, was converted so that the ink discharge head shown in FIG. 2 was mounted on a pen plotter section, and the precursor for lithographic printing prepared as described above was placed on a counter electrode spaced at 1.5 mm. Printing was performed on the precursor for lithographic printing by use of oil-based ink (IK-1) described above to conduct processing. Successively, heating was carried out for 20 seconds by use of a Ricoh Fuser Model 592 (manufactured by Ricoh Co., Ltd.), adjusting the surface temperature of an ink image surface to 70° C., thereby sufficiently fixing an image area.

A copied image of the resulting processed material (namely, the printing plate) was visually observed under an optical microscope at a magnification of 200×. As a result, the copied image had no problem, fine lines and fine letters were good, abnormalities such as blurs, missing and dullness were not observed, and contamination was not observed in a non-image area.

Using as a damping solution a solution prepared by diluting SLM-OD (manufactured by Mitsubishi Paper Mill, Ltd.) 50 times with water, and Oliver 94 type (manufactured by Sakurai Seisakusho Co., Ltd.) as a printing material, this printing precursor was printed with a black ink for offset printing.

As a result, 3000 sheets or more of printed material having clear images in which no toning was developed were obtained.

Then, using the above-mentioned ink jet printer, an ink jet test was made. As a result, stable ink jet was obtained even after an elapse of 800 hours.

The ink stored at room temperature for 6 months showed no development of aggregates, and gave stable ink jet in the same jet test as described above.

When the processed printing plate under these conditions was actually printed, 3000 sheets or more of printed material having clear images in which no toning was developed were obtained.

Furthermore, the redispersibility of the ink was evaluated under enforced conditions. That is, the discharge head used in the above-mentioned printer was filled with the ink, taken away and allowed to stand at 35° C. for 3 days. Then, the discharge head was immersed in Isoper G for 3 minutes, followed by mild stirring. Thereupon, ink (IK-1) was all removed from the inside of the slit.

That is, this is considered to be caused by that the ink (IK-1) adhered to the leading edge of the slit of the discharge head in the non-fluid state by standing was easily redispersed by the solvation with the dispersing medium.

EXAMPLES 2 TO 6 AND COMPARATIVE EXAMPLES 1 AND 2

Using wood free paper having a basis weight of 100 g/m² as a substrate, one surface of the substrate was coated with a coating for a backcoat layer having the following composition using a wire bar to form the under layer having a dry amount coated of 12 g/m². The smoothness of the surface of the backcoat layer was adjusted to 50 (second/10 ml) by a calender treatment.

Coating for Backcoat Layer:

| | |
|---|---|
| Kaolin (50% water dispersion) | 200 parts |
| Polyvinyl alcohol solution (10%) | 60 parts |
| SBR Latex (solid: 50%, Tg 0° C.) | 100 parts |
| Melamine resin (solid: 80%, Sumirez resin SR-613) | 5 parts |

The other surface of the substrate was further coated with coatings A–G for an under layer having the following composition shown in Table 6 using a wire bar to form the under layer having a dry amount coated of 10 g/m². Then, a calender treatment was conducted, establishing the calender conditions so that the smoothness of the backcoat layer is adjusted to about 1500 (second/10 ml). The thus obtained water-resist support Nos. 1–7 was obtained by using the coating formulations A–G, respectively.

TABLE 6

| | Composition (% by weight) | | | | |
|---|---|---|---|---|---|
| Formu-lation | Carbon black | Clay | SBR latex | Melamine | Support No. |
| A | 0 | 60 | 36 | 4 | 1 |
| B | 3 | 57 | 36 | 4 | 2 |
| C | 5.4 | 54.6 | 36 | 4 | 3 |
| D | 7.2 | 52.8 | 36 | 4 | 4 |
| E | 9 | 51 | 36 | 4 | 5 |
| F | 15 | 45 | 36 | 4 | 6 |
| G | 30 | 30 | 36 | 4 | 7 |

Coating for Under Layer:

Carbon black (30% water dispersion)

Clay (50% dispersion solution)

SBR Latex (solid: 50%, Tg 25° C.)

Melamine resin (solid: 80%, Sumirez resin SR-613)

The above components were mixed according to Table 7, and water was added to adjust the total solid concentration to 25% to obtain coatings A to G for an under layer.

1) Specific Electric Resistance of Under Layer

The specific electric resistance of the under layer was measured by the following.

Coatings A to G for the under layer each was coated on a sufficiently desensitized and washed stainless solution. The specific electric resistance of the thus obtained 7 samples were measured by a three terminal process having a gourd electrode according to JIS K-6911. The results are shown in Table 7.

TABLE 7

| Formulation of under layer | Specific electric resistance (Ωcm) |
|---|---|
| A | $2 \times 10^{12}$ |
| B | $1 \times 10^{11}$ |
| C | $4 \times 10^{9}$ |
| D | $1 \times 10^{8}$ |
| E | $7 \times 10^{4}$ |
| F | $5 \times 10^{3}$ |
| G | $4 \times 10^{3}$ |

On support sample Nos. 1 to 7, dispersions having the following composition were coated to form an image receiving layer having a dry amount coated of 6 g/m² to obtain precursor samples for lithographic printing Nos. 1 to 7, respectively. Furthermore, the Beck smoothness of the surface of each precursors was 200 to 230 (second/10 ml), and the contact angle with water thereof was 5 degree or less.

Composition for Image-Receiving Layer

The following composition 1 having the following contents was placed in a paint shaker (manufactured by Toyo Seiki Co., Ltd.) together with glass beads, and dispersed for 60 minutes. Then, the glass beads were filtered off to obtain a dispersion.

Composition:

| | |
|---|---|
| 10% Gelatin solution | 100 g |
| Silica: Silysia 310 (manufactured by Fuji Silysia Chemical Co., Ltd.) | 22 g |
| 10% Solution of Aluminasol (manufactured by Nissan Chemical Industries, Ltd.) | 90 g |
| Alkyl Ester Fluoride FC 430 (manufactured by 3M Co.) | 0.3 g |
| Hardening Compound (K-2) [$CH_2$=$CHSO_2CH_2CONH(CH_2)_3NHCOCH_2SO_2CH$=$CH_2$] | 1.5 g |
| Water | 70 g |

A servo plotter, DA8400, manufactured by Graphtech Co., which can write an output from a personal computer, was converted so that the ink discharge head shown in FIG. 2 was mounted on a pen plotter section, and the precursor for lithographic printing prepared as described above was placed on a counter electrode spaced at 1.5 mm. Printing was performed on the precursor for lithographic printing by use of oil-based ink (IK-2) described below to conduct processing. In processing, the under layer provided directly under the image receiving layer of sample Nos. 1 to 7 of the precursor for lithographic printing and a counter electrode was electrically connected using silver paste.

Preparation of Oil-Based Ink (IK-2)

Ten grams of a copolymer of dodecyl methacrylate and acrylic acid (copolymerization ratio: 95/5 by weight), 10 g of Nigrosine and 30 g of Shellsol 71 were placed in a paint shaker (manufactured by Tokyo Seiki Co., Ltd.) together with glass beads, and dispersed for 4 hours to obtain a fine dispersion of Nigrosine.

Forty grams (as a solid amount) of latex particles (PL-6) of Production Example 206, 7.5 g of the above-mentioned Nigrosine dispersion, and 0.08 g of an octadecyl vinyl ether-half maleic acid dodecylamide copolymer were diluted with 1 liter of Isoper G, thereby preparing black oil-based ink.

After the above processing, in a fully automatic printer (AM-2850, produced by AM Co., Ltd.), a solution obtained by diluting SLM-OD 15 times with water was added as damping water into a dish for damping water, and the processed material was inserted into the printer by using a black ink for offset printing.

The image quality of the thus obtained drawn image of the processing material was evaluated as follows. The results are shown in Table 8.

TABLE 8

|  |  | Property | | |
|---|---|---|---|---|
| Ex. | Support No. | Image quality of processed material | Printed image | Printable number in printing |
| 2 | 3 | Good | Good | 1500 |
| 3 | 4 | Very good | Very good | 3000 |
| 4 | 5 | Very good | Very good | 3000 |
| 5 | 6 | Very good | Very good | 3000 |
| 6 | 7 | Very good | Very good | 3000 |
| Comp. Ex. 1 | 1 | Bad | Bad | 50 |
| Comp. Ex. 2 | 2 | Bad | Bad | 100 |

1) Image Quality of Pro8cessed Material

A drawn image of the resulting processed material was visually observed under an optical microscope at a magnification of 200×. The results are represented as shown below.
Very good:

Completely no problem in drawn images, very good fine lines and fine letters

Good:

No problem in drawn images, good fine lines and fine letters

Bad:

Lacking and blurring of fine lines and fine letters

2) Printed images

The images of the resulting printed material were evaluated in the same manner as the above image quality of the processed material.

3) Printability (Run Length)

Printable numbers having no toning of the printed material and lack of the images visually were examined.

By referring to the specific electrical resistance shown in Table 7, the results in Table 8 are considered.

In Examples 2 to 6 having a large specific electrical resistance of $10^5$ to $10^3$ Ωcm, the resulting images are missed and blurred. As a result of blurring, since the resin layer of the drawn images becomes thin, the printability is poor.

On the other hand, in Comparative Examples 1 and 2 having a small specific electrical resistance of $10^{12}$ to $10^{11}$ Ωcm, the resulting images have no problem, the fine lines and fine letters are very good, and the printability is high.

That is, the results show that the higher the electroconductivity of the under layer of the support directly under the image receiving layer is, the more excellent the processed images and the printed images are.

Furthermore, similarly to Example 101, the ink jet test for 800 hours and the enforced test of the redispersibility in ink (IK-2) also showed the same good performance.

EXAMPLE 7

Preparation of Lithographic Printing Plate Precursor

The following composition 1 having the following contents was placed in a paint shaker (manufactured by Toyo Seiki Co., Ltd.) together with glass beads, and dispersed for 60 minutes. Then, the glass beads were filtered off to obtain a dispersion.

Composition:

| | |
|---|---|
| 10% Gelatin solution | 100 g |
| Silica: Silysia 310 (manufactured by Fuji Silysia Chemcial Co., Ltd.) | 25 g |
| Colloidal Silica: (Snowtex C) | 100 g |
| Sodium dodecylbenzenesulfonate | 2.0 g |
| Hardening Compound [$CH_2$=$CHSO_2CH_2CONH(CH_2)_3NHCOCH_2SO_2CH$=$CH_2$] | 2.2 g |
| Water | 65 g |

Using the support in Example 6, the above-mentioned composition was applied onto the support by use of a wire bar and dried at 100° C. for 20 minutes to form an image receiving layer having an amount coated of 6 g/m$^2$, thereby obtaining a precursor for lithographic printing. The Beck smoothness of the surface was 210 (second/10 ml), and the contact angle with water thereof was 5 degree or less.

In the same manner as in Example 6, processing was carried out by using the precursor for lithographic printing and the following oil-based ink (IK-3) to prepare a printing plate, and offset printing was carried out.

Oil-Based Ink (IK-3)

A mixture of 500 g of white dispersion (PL-11) obtained in Production Example 211 of resin particles and 7.5 g of Sumikaron Black was heated to a temperature of 100° C., and stirred for 6 hours under heating. After cooling to room temperature, the product was passed through a 200-mesh nylon cloth to remove the remaining dye, thereby obtaining a black resin dispersion having an average particle size of 0.20 μm.

Then, 250 g of the above-mentioned black resin dispersion and 0.10 g of charge regulating agent (CD-3) shown below were diluted with 1 liter of Isoper G, thereby preparing black oil-based ink.

$$\text{-(CH}_2\text{CH)}_{50}\text{-(CH-CH)}_{25}\text{-(CH-CH)}_{25}\text{-} \quad \text{CD-3}$$

with substituents $C_{10}H_{21}$, C=O—N($C_{12}H_{25}$)—C=O, COOH, $CONHC_{12}H_{25}$ (Mole ratio)

The resulting printed material had clear image quality with no stain in a non-image area, similarly to the printed material of Example 6, and the press life thereof was as good as 3000 sheets or more.

Furthermore, similarly to Example 101, the ink jet test for 800 hours and the enforced test of the redispersibility in ink (IK-3) also showed the same good performance.

EXAMPLES 8 TO 21

Plate-making processing and printing were conducted in the same manner as in Example 1 with the exception that oil-based ink described in Table 9 shown below was used in place of oil-based ink (IK-1). The oil-based ink used was prepared in the same manner as in oil-based ink (IK-1) with the exception that 45 g (as a solid amount) of latex particles described Table 9 shown below were used in place of latex particles (PL-1).

TABLE 9

| Example | Oil-based Ink | Latex Particles (PL) |
|---------|---------------|----------------------|
| 8 | IK-4 | PL-3 |
| 9 | IK-5 | PL-4 |
| 10 | IK-6 | PL-5 |
| 11 | IK-7 | PL-6 |
| 12 | IK-8 | PL-7 |
| 13 | IK-9 | PL-8 |
| 14 | IK-10 | PL-9 |
| 15 | IK-11 | PL-10 |
| 16 | IK-12 | PL-12 |
| 17 | IK-13 | PL-13 |
| 18 | IK-14 | PL-14 |
| 19 | IK-15 | PL-15 |
| 20 | IK-16 | PL-16 |
| 21 | IK-17 | PL-17 |

The resulting printed material had clear image quality with no stain in a non-image area, similarly to the printed material of Example 1, and the press life thereof was as good as 3000 sheets or more.

Furthermore, similarly to Example 1, the ink jet test for 800 hours and the enforced test of the redispersibility also showed the same good performance as that of ink (IK-1).

EXAMPLE 22

Plate-making processing and printing were carried out in the same manner as in Example 2, provided that oil-based ink (IK-18) described below was used in place of oil-based ink (IK-1) used in Example 1.

Oil-Based Ink (IK-18)

A mixture of 300 g of white dispersion (PL-2) obtained in Production Example 202 and 5 g of Victoria Blue B was heated to a temperature of 100° C., and stirred for 4 hours under heating. After cooling to room temperature, the product was passed through a 200-mesh nylon cloth to remove the remaining dye, thereby obtaining a blue resin dispersion having an average particle size of 0.22 μm.

Then, 260 g of tho above-mentioned blue resin dispersion and 0.15 g of zirconium naphthenate ware diluted with 1 liter of Shellsol 71, thereby preparing blue oil-based ink.

The resulting printed material had clear image quality with no stain in a non-image area, similarly to the printed material of Example 1, and the press life thereof was as good as 3000 sheets or more.

Furthermore, similarly to Example 1, the ink jet test for 800 hours and the enforced test of the redispersibility also showed the same good performance as that of ink (IK-1).

While the invention has been described in detail and with reference to specific embodiments thereof, it will be apparent to one skilled in the art that various changes and modifications can be made therein without departing from the spirit and scope thereof.

What is claimed is:

1. A method for preparing a printing plate by an ink jet process consisting essentially of discharging an oily ink using an electrostatic field on a water-resistant support having provided thereon an image receiving layer having a lithographically printable hydrophilic surface dropwise from a head having a discharge electrode to form an image on the lithographically printable hydrophilic surface, wherein the oily ink comprises resin particles dispersed in a nonaqueous solvent having an electric resistance of $10^9$ Ωcm or more and a dielectric constant of 3.5 or less, and said resin particles dispersed are copolymer resin particles obtained by polymerization of a solution comprising:

(i) at least one monofunctional monomer (A) which is soluble in the nonaqueous solvent and becomes insoluble therein by polymerization;

(ii) at least one monofunctional macromonomer (MA) having a weight average molecular weight of $2 \times 10^4$ or less in which a polymerizable double bond group represented by the following formula (II) is combined with only one end of a main chain of a polymer comprising a repeating unit represented by the following formula (I):

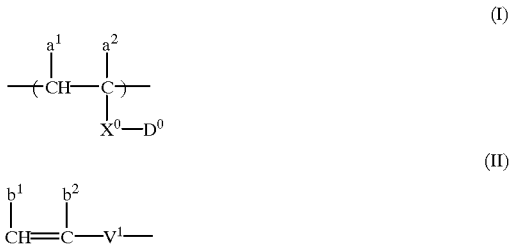

wherein, in formula (I), $X^0$ represents —COO—, —OCO—, —$(CH_2)_r$COO—, —$(CH_2)_r$OCO—, —O—, —$SO_2$—, —CONHCONH—, —CONHCONH—, —CON$(D^{11})$-, —$SO_2N(D^{11})$- or a phenylene group, in which $D^{11}$ represents a hydrogen atom or a hydrocarbon group having 1 to 22 carbon atoms, and r represents an integer of 1 to 4;

$a^1$ and $a^2$ are the same or different, and each represents a hydrogen atom, a halogen atom, a cyano group, a hydrocarbon group, —COO-$D^{12}$, or —COO-$D^{12}$ linked through a hydrocarbon group, in which $D^{12}$ represents a hydrogen atom or a hydrocarbon group which may be substituted;

$D^0$ represents a hydrocarbon group having 8 to 22 carbon atoms or a substituent having a total number of atoms of 8 or more, provided that hydrogen atoms attached to a carbon or nitrogen atom are excluded from the number, represented by the following formula (I'):

wherein, in formula (I'), $D^{21}$ represents a hydrogen atom or an aliphatic group having 1 to 22 carbon atoms;

$B^1$ and $B^2$ are the same or different, and each represents —O—, —CO—, —$CO_2$—, —OCO—, —$SO_2$—, —N($D^{22}$)-, —CON($D^{22}$)-, or —N($D^{22}$)CO—, in which $D^{22}$ has the same meaning as $D^{21}$;

$A^1$ and $A^2$ are the same or different, and each represents at least one group selected from a group represented by the following formula (I") and a hydrocarbon group having 1 to 18 carbon atoms, which each may be substituted, provided that, in the case where $A^1$ or $A^2$ represents two or more groups selected from a group represented by the following formula (I") and a hydrocarbon group having 1 to 18 carbon atoms, $A^1$ or $A^2$ represents (1) two or more groups represented by formula (I"), (2) a combination of at least one group represented by formula (I") and at least one hydrocarbon group having 1 to 18 carbon atoms, or (3) two or more hydrocarbon groups having 1 to 18 carbon atoms:

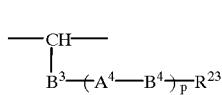 (I″)

wherein, in formula (I″), $B^3$ and $B^4$ are the same or different, and each has the same meaning as $B^1$ and $B^2$;

$A^4$ represents a hydrocarbon group having 1 to 18 carbon atoms which may be substituted;

$D^{23}$ has the same meaning as $D^{21}$; and m, n and p are the same or different, and each represents an integer of 0 to 4, provided that m, n and p are not 0 at the same time;

wherein, in formula (II), $V^1$ represents —COO—, —CONHCOO—, —CONHCONH—, —CONH—, or a phenylene group; and $b^1$ and $b^2$ are the same or different, and each has the same meaning as $a^1$ and $a^2$ in formula (I); and (iii) at least one resin (P) for dispersion stabilization which is colloidally dispersed in the nonaqueous solvent and contains (iiia) at least one macromonomer (MM) having a weight average molecular weight of $1\times10^3$ to $2\times10^4$ in which a polymerizable double bond group which is selected from the polymerizable double bond groups represented by the above formula (II) is combined with only one end of a main chain of a polymer comprising a repeating unit represented by the following formula (III):

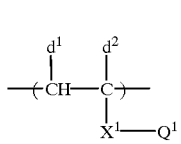 (III)

wherein, in formula (III), $X^1$ has the same meaning as $X^0$ in formula (I);

$d^1$ and $d^2$ are the same or different, and each has the same meaning as $a^1$ and $a^2$ in formula (I); and $Q^1$ represents an alkyl or alkenyl group having 10 to 22 carbon atoms; and (iiib) at least one monofunctional monomer (M) which is soluble in the nonaqueous solvent and becomes insoluble therein by polymerization;

wherein the water-resistant support has a specific electric resistance of $10^{10}$ Ωcm or less at least at an area directly under the image receiving layer;

wherein the resin particles dispersed in the oily ink are electrically detectable particles positively or negatively charged;

wherein the lithographically printable hydrophilic surface faces the discharge electrode and a counter electrode is provided on the opposite side thereof;

wherein said resin (P) for dispersion stabilization is dispersed colloidally into the nonaqueous solvent to have an average particle diameter of 0.13 μm or less.

2. The method according to claim 1, wherein said water-resistant support is a support having a specific electric resistance of $10^{10}$ Ωcm or less as a whole of the support.

* * * * *